US006874535B2

(12) United States Patent
Parsons et al.

(10) Patent No.: US 6,874,535 B2
(45) Date of Patent: Apr. 5, 2005

(54) DEVICE AND METHOD FOR OPERATING AT LEAST TWO VALVES

(75) Inventors: Natan E. Parsons, Brookline, MA (US); David Hadley, Franklin, MA (US); Robert Shamitz, Brighton, MA (US); Kay Herbert, Winthrop, MA (US)

(73) Assignee: Arichell Technologies, Inc., West Newton, MA (US)

( * ) Notice: Subject to any disclaimer, the term of this patent is extended or adjusted under 35 U.S.C. 154(b) by 0 days.

(21) Appl. No.: 10/440,997

(22) Filed: May 19, 2003

(65) Prior Publication Data

US 2003/0196706 A1 Oct. 23, 2003

Related U.S. Application Data

(63) Continuation of application No. PCT/US01/43277, filed on Nov. 20, 2001, which is a continuation-in-part of application No. 09/718,026, filed on Nov. 20, 2000, now Pat. No. 6,508,272.

(51) Int. Cl.$^7$ .............................................. F16K 11/24
(52) U.S. Cl. .............. 137/607; 251/129.03; 251/129.04
(58) Field of Search .................... 137/607; 251/129.03, 251/129.04; 4/673

(56) References Cited

U.S. PATENT DOCUMENTS

| 1,607,935 A | * 11/1926 | Ackley ........................... 4/673 |
| 2,496,553 A | 2/1950 | Littlefield |
| 3,099,019 A | * 7/1963 | Tiller ............................. 4/689 |
| 3,472,277 A | 10/1969 | Reinicke et al. ............. 137/595 |
| 3,550,901 A | 12/1970 | McIntosh ...................... 251/38 |
| 4,116,377 A | 9/1978 | Andersson et al. ........ 236/12 A |
| 4,223,698 A | 9/1980 | Reinicke ..................... 137/595 |
| 4,225,111 A | 9/1980 | Stahle .......................... 251/87 |
| 4,408,745 A | 10/1983 | Swiers et al. ................ 251/357 |
| 4,520,516 A | 6/1985 | Parsons .......................... 4/623 |
| 4,543,991 A | 10/1985 | Fuchs .......................... 137/595 |
| 4,604,735 A | 8/1986 | Parsons ........................ 367/93 |
| 4,669,653 A | 6/1987 | Avelov .................... 236/12.13 |
| 4,681,141 A | 7/1987 | Wang .......................... 137/607 |
| 4,709,728 A | * 12/1987 | Ying-Chung ............. 137/636.4 |
| 4,735,357 A | * 4/1988 | Gregory et al. ........... 236/93 R |

(Continued)

FOREIGN PATENT DOCUMENTS

| EP | 0 245 577 A1 | 11/1987 |
| EP | 0401468 | 12/1990 |
| WO | WO 85/01337 | 3/1985 |
| WO | WO 87/05352 | 9/1987 |
| WO | WO 89/02086 | 3/1989 |
| WO | WO 91/17377 | 11/1991 |
| WO | WO 91/17380 | 11/1991 |
| WO | WO 91/17458 | 11/1991 |
| WO | WO 92/17656 | 10/1992 |
| WO | WO 99/61938 | 12/1999 |
| WO | WO 00/38561 | 7/2000 |
| WO | WO 00/38562 | 7/2000 |

*Primary Examiner*—Stephen M. Hepperle
(74) *Attorney, Agent, or Firm*—Ivan D. Zitkovsky

(57) ABSTRACT

A valve device and a method for operating at least two valves is actuated by an actuator and arranged for controlling fluid flow in at least two separate fluid lines. The two valves are preferably diaphragm operated valves, but may be also piston valves. The valve device includes a pressure release mechanism constructed to change pressure in a diaphragm chamber of each diaphragm operated valve and thereby open or close the valve. The pressure release mechanism may include a fluid passage in communication with each diaphragm chamber, where it is simultaneously controlled by a movement of a single sealing member actuated by a single actuator. The valve device may also include a manual actuator.

35 Claims, 29 Drawing Sheets

U.S. PATENT DOCUMENTS

| | | | |
|---|---|---|---|
| 4,901,750 A | 2/1990 | Nicklas et al. | 137/270 |
| 4,953,141 A | 8/1990 | Novak et al. | 367/108 |
| 4,962,790 A | 10/1990 | Chou et al. | 137/599 |
| 5,062,164 A | 11/1991 | Lee et al. | 4/194 |
| 5,092,560 A | 3/1992 | Chen | 251/30.03 |
| 5,095,941 A * | 3/1992 | Betz | 137/552 |
| 5,095,944 A | 3/1992 | Hochstrasser | 137/607 |
| 5,111,846 A | 5/1992 | Hochstrasser et al. | 137/607 |
| 5,125,621 A | 6/1992 | Parsons et al. | 251/30.03 |
| 5,181,538 A | 1/1993 | Manganaro | 137/607 |
| 5,251,188 A | 10/1993 | Parsons et al. | 367/140 |
| 5,255,398 A | 10/1993 | Flynn et al. | 4/496 |
| 5,299,592 A | 4/1994 | Swanson | 137/59 |
| 5,329,965 A | 7/1994 | Gordon | 137/599 |
| 5,339,859 A | 8/1994 | Bowman | 137/337 |
| 5,456,279 A | 10/1995 | Parsons et al. | 137/245 |
| 5,456,448 A | 10/1995 | Chou | 251/230 |
| 5,464,041 A | 11/1995 | Reinicke | 137/595 |
| 5,467,799 A | 11/1995 | Buccicone et al. | 137/625.41 |
| 5,505,227 A * | 4/1996 | Pubben | 137/607 |
| 5,511,579 A | 4/1996 | Price | 137/337 |
| 5,535,781 A | 7/1996 | Paterson et al. | 137/624.11 |
| 5,564,462 A | 10/1996 | Storch | 137/337 |
| 5,595,216 A | 1/1997 | Pilolla | 137/607 |
| 5,599,003 A | 2/1997 | Seemann et al. | 251/30.03 |
| D381,008 S | 7/1997 | Parsons et al. | D13/153 |
| 5,655,747 A | 8/1997 | Pasut | 251/30.03 |
| D396,090 S | 7/1998 | Marcichow et al. | D23/233 |
| 5,775,372 A | 7/1998 | Houlihan | 137/624.12 |
| 5,819,336 A | 10/1998 | Gilliam et al. | 4/623 |
| 5,855,356 A | 1/1999 | Fait | 251/129.04 |
| 5,883,557 A | 3/1999 | Pawlak et al. | 335/179 |
| 5,915,417 A | 6/1999 | Diaz et al. | 137/624.11 |
| 5,918,855 A | 7/1999 | Hamanaka et al. | 251/129.04 |
| 5,979,500 A | 11/1999 | Jahrling et al. | 137/624.12 |
| 5,984,262 A | 11/1999 | Parsons et al. | 251/129.04 |
| 6,019,130 A * | 2/2000 | Rump | 137/601.01 |
| 6,039,067 A | 3/2000 | Houlihan | 137/337 |
| 6,085,790 A | 7/2000 | Humpert et al. | 137/801 |
| 6,109,288 A * | 8/2000 | Al-Hamlan | 137/87.01 |
| 6,123,315 A | 9/2000 | Keller | 251/41 |
| 6,123,839 A | 9/2000 | Sussman | 210/136 |
| 6,250,601 B1 | 6/2001 | Kolar et al. | 251/129.04 |
| 6,273,394 B1 | 8/2001 | Vincent et al. | 251/129.04 |
| 6,298,872 B1 | 10/2001 | Keller | 137/360 |
| 6,508,272 B1 * | 1/2003 | Parsons et al. | 137/595 |

* cited by examiner

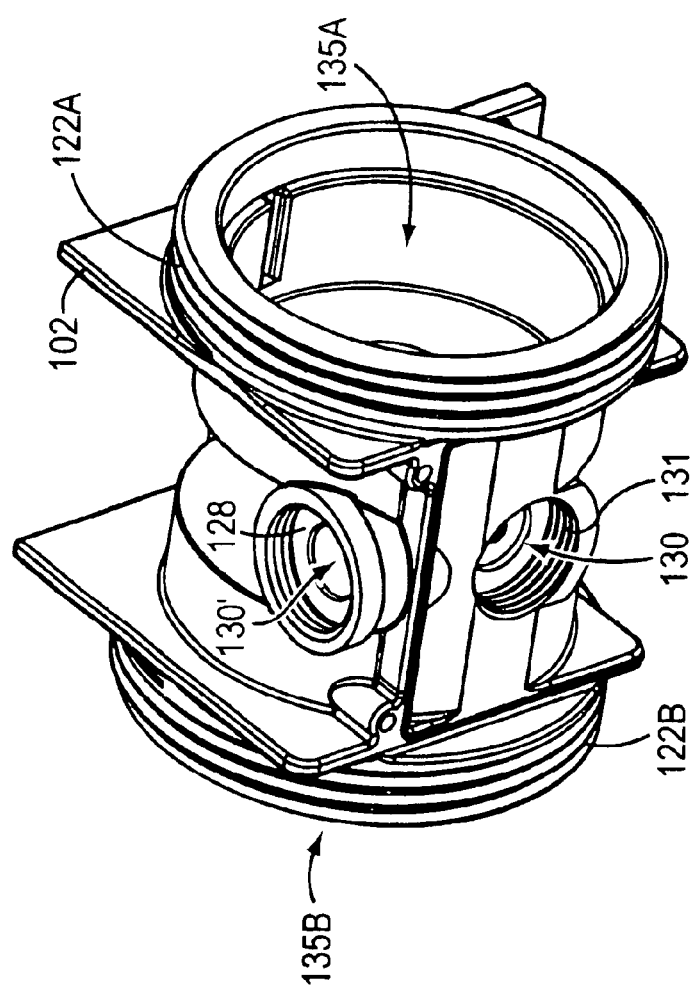

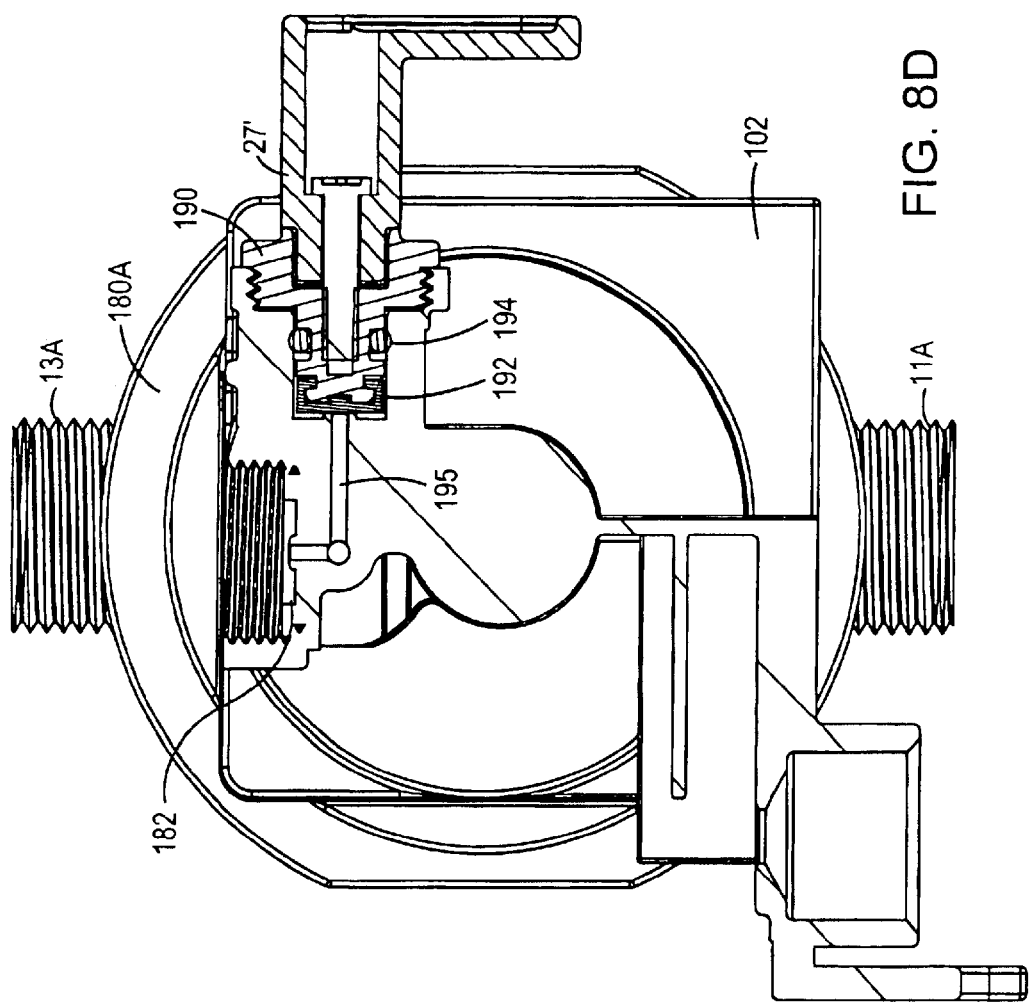

DEVICE AND METHOD FOR OPERATING AT LEAST TWO VALVES

This application is a continuation of PCT Application PCT/US01/43277, filed Nov. 20, 2001 which is a continuation-in-part of U.S. application Ser. No. 09/718,026 filed Nov. 20, 2000, now a U.S. Pat. No. 6,508,272.

BACKGROUND OF THE INVENTION

The present invention relates to a valve device and a method for operating at least two fluid valves using an actuator.

In public facilities or large private facilities, automatic water dispensing systems have provided numerous advantages including improved sanitation, water conservation, and reduced maintenance cost. Since numerous infectious diseases are transmitted by contact, public-health authorities have encouraged the public and mandated to food workers the exercise of proper hygiene including washing hands effectively. Effective hand washing has been made easier by automatic faucets. Automatic faucets typically include an object sensor that detects presence of an object, and an automatic valve that turns water on and off based on a signal from the sensor. If the water temperature in an automatic faucet is not in an optimal range, individuals tend to shorten their hand washing time. To obtain an optimal water temperature, a proper mixing ratio of hot and cold water and proper water actuation has to be achieved. Automatic faucets usually use an automatic valve that controls water flow after mixing.

There are numerous other applications in the chemical or food processing industries where there is a need to control fluid flow in multiple fluid lines by a single actuator.

SUMMARY OF THE INVENTION

The present invention relates to a valve device and a method for operating at least two valves actuated by an actuator and arranged for controlling fluid flow in at least two separate fluid lines.

According to one aspect, a valve device for simultaneously controlling fluid flow in separate fluid lines includes at least two diaphragm operated valves actuated by a single actuator and arranged for controlling fluid flow in at least two separate fluid lines. The valve device uses a pressure release mechanism constructed to change pressure in a diaphragm chamber of each diaphragm-operated valve and thereby open or close the diaphragm operated valve.

According to another aspect, a valve device includes a main body, a pilot mechanism, and a check valve. The main body is constructed to receive a first valve that includes a first fluid input port and a first fluid output port, and a second valve that includes a second fluid input port and a second fluid output port. The pilot mechanism is constructed to simultaneously control flow of a first fluid between the first input and output ports and control flow of a second fluid between the second input and output ports. The check valve is co-operatively constructed with the pilot mechanism and arranged to prevent mixing of the first and second fluids.

According to yet another aspect, a valve device for simultaneously controlling fluid flow in separate fluid lines includes a first valve and a second valve and an automatic actuator and a manual actuator. The first valve includes a first fluid input port and a first fluid output port, and the second valve includes a second fluid input port and a second fluid output port. The automatic actuator is arranged to automatically control a pilot mechanism for simultaneously controlling flow of first fluid between the first input and output ports and flow of second fluid between the second input and output ports. The manual actuator is arranged to manually control the pilot mechanism.

Preferred embodiments of these aspects include one or more of the following features:

The device may include a check valve located at a pilot level of the diaphragm valve, wherein the check valve is constructed to prevent mixing of fluids from two separate fluid lines. The pressure release mechanism may include a fluid passage being in communication with each diaphragm chamber and being arranged to be simultaneously controlled by a movement of a single sealing member actuated by a single actuator. The fluid passage may be constructed to receive a spring and a ball arranged to prevent fluid crossflow between the two separate fluid lines.

The actuator of the valve device may be a manual actuator, an electromagnetic actuator or a bi-stable electromagnetic actuator. The single automatic actuator may include a manual override. The manual override may operate without electric power. The manual actuator may be constructed and arranged to manually switch position of the bistable solenoid. The actuator may include a solenoid constructed and arranged to move a plunger, wherein a sealing member may be located on the distal end of the plunger.

The valve device may be installed as part of a faucet, wherein the first of the fluid lines is arranged to convey hot water and the second of the fluid lines is arranged to convey cold water.

Preferably, the first and second valves are diaphragm operated valves and the pilot mechanism includes a pressure release mechanism constructed to simultaneously control pressure at each diaphragm and thereby open or close each diaphragm operated valve. The first and second valves can operate under a large differential pressure between the two input fluid lines (or output fluid lines), including no pressure in one fluid line. Preferably, the device is constructed with the differential pressure of about 20 psi, but the differential pressure may be even about 60 psi or higher.

The main body may include a vent passage in communication with both the diaphragms including a ball and a spring forming a check valve. The main body may be constructed to have the diaphragm-operated valves arranged symmetrically with respect to a pressure release mechanism. The pressure release mechanism may be constructed to simultaneously or sequentially lower pressure and thereby open each diaphragm-operated valve. The manual actuator may be constructed and arranged to manually control pressure at the pressure release mechanism and thereby control pressure in a diaphragm chamber of each diaphragm operated valve.

Alternatively, at least one of the valves may be a diaphragm valve, a piston valve, a needle valve, a gate valve, a globe valve, or a butterfly valve. Alternatively, in valves requiring large water flow, at least one of the valves may include two diaphragms arranged in a series. In this embodiment, the first smaller diaphragm is controlled by an automatic or manual actuator. The second larger diaphragm, enabling a larger fluid flow, is controlled by the first smaller diaphragm. This design may also be applied to controlling just a single fluid conduit (e.g., a valve controlling water flow after a mixing valve).

According to yet another aspect, an automatic faucet system includes a water outlet, an object sensor connected to a control circuit, a hot water pipe, a cold water pipe, and a valve device. The valve device has two valves actuated by an automatic actuator for separately controlling the flow of hot water and cold water based on signals received from the control circuit.

The device may include hot water input and output ports and cold-water input and output ports, a pilot mechanism, and a check valve. The pilot mechanism simultaneously controls flow of hot water between the hot water input and output ports and flow of cold water between the cold water input and output ports. The check valve is co-operatively constructed with the pilot mechanism and arranged to prevent mixing of hot and cold water. The pilot mechanism may include a pressure release mechanism constructed to simultaneously lower pressure at each diaphragm and thereby open each diaphragm operated valve.

The main body of the valve device may be constructed to have the diaphragm operated valves arranged symmetrically with respect to the pressure release mechanism. The pressure release mechanism may include a fluid passage in communication with each diaphragm chamber and arranged to be simultaneously controlled by a movement of a single sealing member actuated by a single automatic actuator.

The automatic actuator may include an electromagnetic actuator or a bi-stable electromagnetic actuator. The valve device may further include a manual actuator constructed to control flow of the hot water and the cold water independently of the automatic actuator. Alternatively, a manual actuator may be constructed to override the automatic actuator.

Furthermore, the above-described device may include three or more valves controlled by a single actuator. The manual actuator may be a manual override valve that resides in close proximity to the actuator and is coupled in parallel to the pressure release mechanism (i.e. in parallel to the hydraulic passages) controlled by the automatic actuator. The manual actuator provides a means for opening and closing the main valve by controlling the pressure when loss of electrical power or other failure disables the automatic actuator.

Alternatively, a valve device includes other types of valves, wherein again two valves are actuated by a single actuator. These valves may be a piston valve, a needle valve, a gate valve, a globe valve, or a butterfly valve. In general, the actuator may actuate two different types of valves.

In general, the valve device may be used for separately controlling the flow of any fluid, for dispensing separately two types of fluid, and/or for mixing two types of fluid at the same time.

According to yet another aspect, an automatic faucet system includes a water outlet, a water pipe coupled to a valve being actuated by an automatic actuator, and a manual actuator. The automatic actuator is designed to control water flow by controlling the valve. The manual actuator is designed to control water flow independently of the automatic actuator. The system also includes a control for the manual actuator arranged in a control passage. The manual actuator control includes a handle, located above deck near the water outlet, and an elongated body located in the control passage.

Preferred embodiments of this aspect include one or more of the following features: The control passage may be a sink plug control passage that is arranged to accommodate the manual actuator control. The sink plug control passage may also be used to control a sink plug.

The sink plug control passage may include an elongated rigid element arranged for controlling a sink plug and an elongated flexible element that is an element of the manual actuator control. The elongated, rigid element may include a tube arranged to receive the elongated flexible element controlling the manual actuator. Alternatively, the control passage may be a water pipe passage or any existing passage (i.e., a below deck-to-above deck passage) arranged to accommodate the manual actuator control.

The manual actuator control uses mechanical torque actuation to change a state of the manual actuator. The mechanical torque actuation may include a flex cable or a flexible rod coupled to the handle. Alternatively, the manual actuator control uses hydraulic torque actuation to change a state of the manual actuator. The hydraulic torque actuation includes a flexible tube filled with fluid. Alternatively, the manual actuator control uses pneumatic torque actuation or electronic actuation to change a state of the manual actuator. The electrical actuation may use a cable located in the passage for communication with the manual actuator or may use a remote control (e.g., using microwaves or other radiation).

This automatic faucet system may also include an object sensor connected to a control circuit and arranged to provide a signal to the automatic actuator.

BRIEF DESCRIPTION OF THE DRAWINGS

FIG. 7B is a perspective view of a body of the valve device shown in FIG. 7.

FIG. 8D is a cross-sectional view of the valve device along a line 8D—8D in FIG. 8B.

DESCRIPTION OF THE PREFERRED EMBODIMENTS

Figure 1:
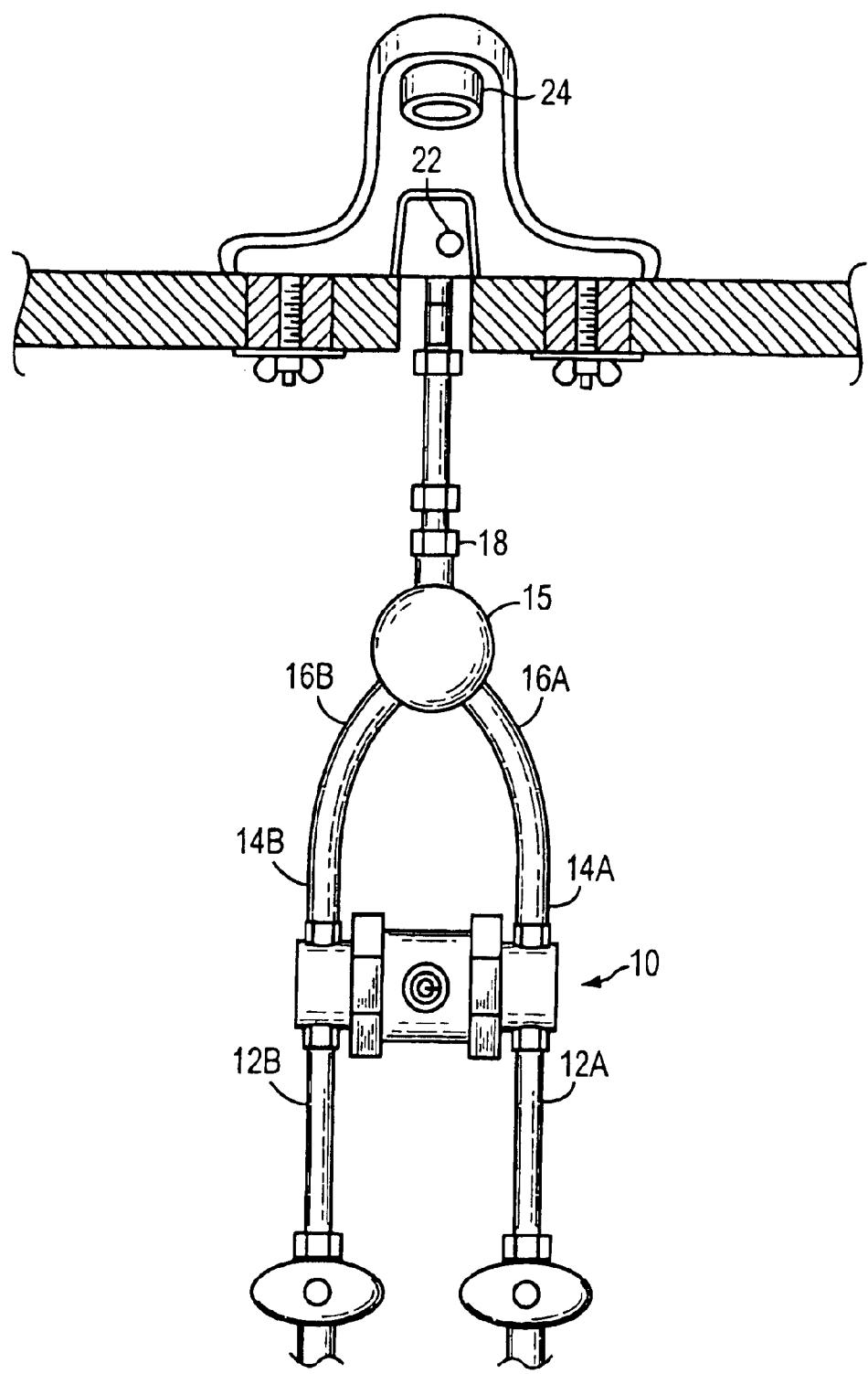
FIG. 1 shows schematically an automatic faucet system including a valve device for controlling flow of hot and cold water.

FIG. 1 illustrates a preferred use of a valve device 10, which includes at least two valves actuated by a single actuator. Valve device 10 controls fluid flowing separately in at least two separate fluid lines, and the device also prevents fluid cross-flow or mixing between the lines by employing one or more check valves.

Figure 1A:
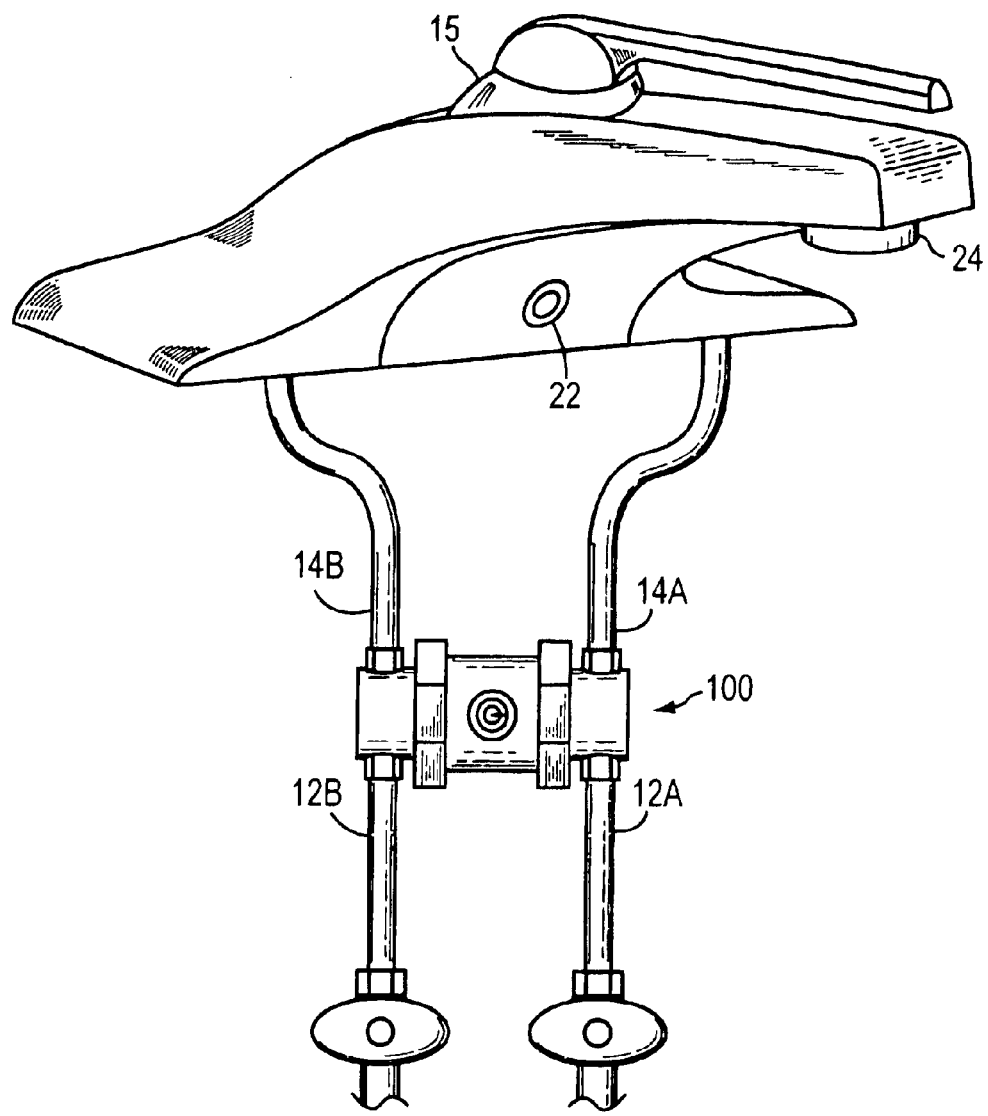
FIG. 1A shows schematically an automatic faucet system including a valve device for controlling flow of hot and cold water connected directly to a mixing faucet.

Referring to FIGS. 1 and 1A, an automatic faucet system includes a valve device 10, a mixing valve 15, a sensor 22 and a faucet with an output 24. Valve device 10 and a mixing valve 15 are installed "below deck" (i.e., below the installation surface of the faucet base, and below the top sink surface, as shown in FIG. 1), while and sensor 22 and faucet output 24 are located "above deck." Valve device 100 is connected directly to a mixing faucet with a mixing valve 15 located "above deck, as shown in FIG. 1A.

Referring to FIG. 1, specifically, valve device 10 is connected to pipes 12A and 14A for providing cold water and pipes 12B and 14B for providing hot water to mixing valve 15. Mixing valve 15 provides a selected mixture of hot and cold water to faucet output 24. Sensor 22 is connected to a sensing and control circuit, as described, for example, in U.S. Pat. No. 5,979,500, which is incorporated by reference. Alternatively, sensor 22 may include a fiberoptic coupling device for transmitting optical signal to a detector, as described in U.S. Pat. No. 5,984,262, which is incorporated by reference.

Sensor 22 detects the presence of an object or a change in the presence of an object (e.g., hands) at faucet output 24, and a control circuit, in turn, provides a signal to a solenoid (or another actuator). The solenoid actuates operation of valve device 10, which controls cold water flow from pipe 12A to pipe 14A and hot water flow from pipe 12B to pipe 14B without allowing any significant mixing of hot and cold water in device 10. In one embodiment, sensor 22 may employ a sensitivity pattern described in U.S. Pat. No. 6,212,697, which is incorporated by reference.

Figure 2:
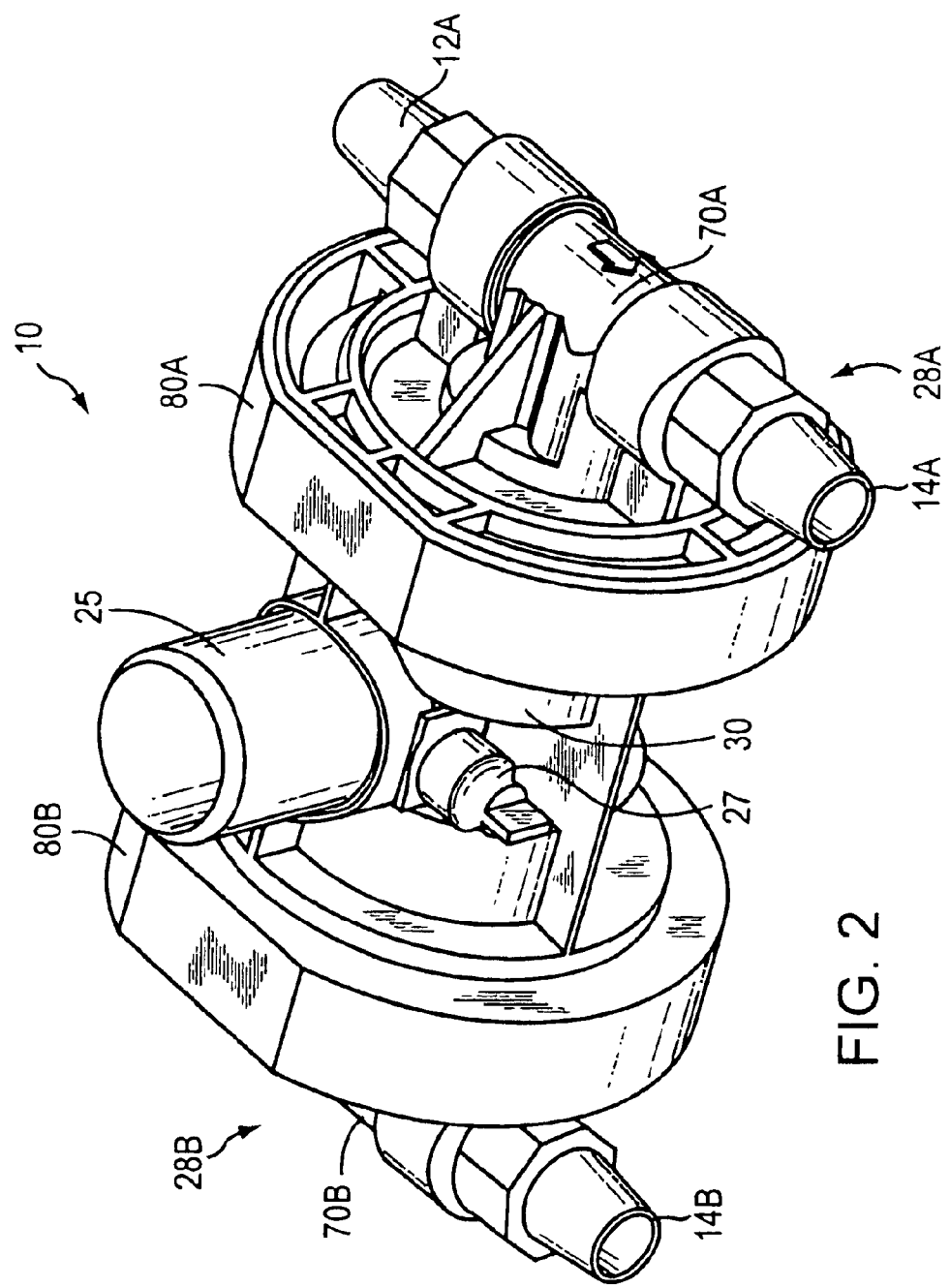
FIG. 2 is a perspective view of the valve device for controlling separately fluid flow in two pipes.
Figure 2A:
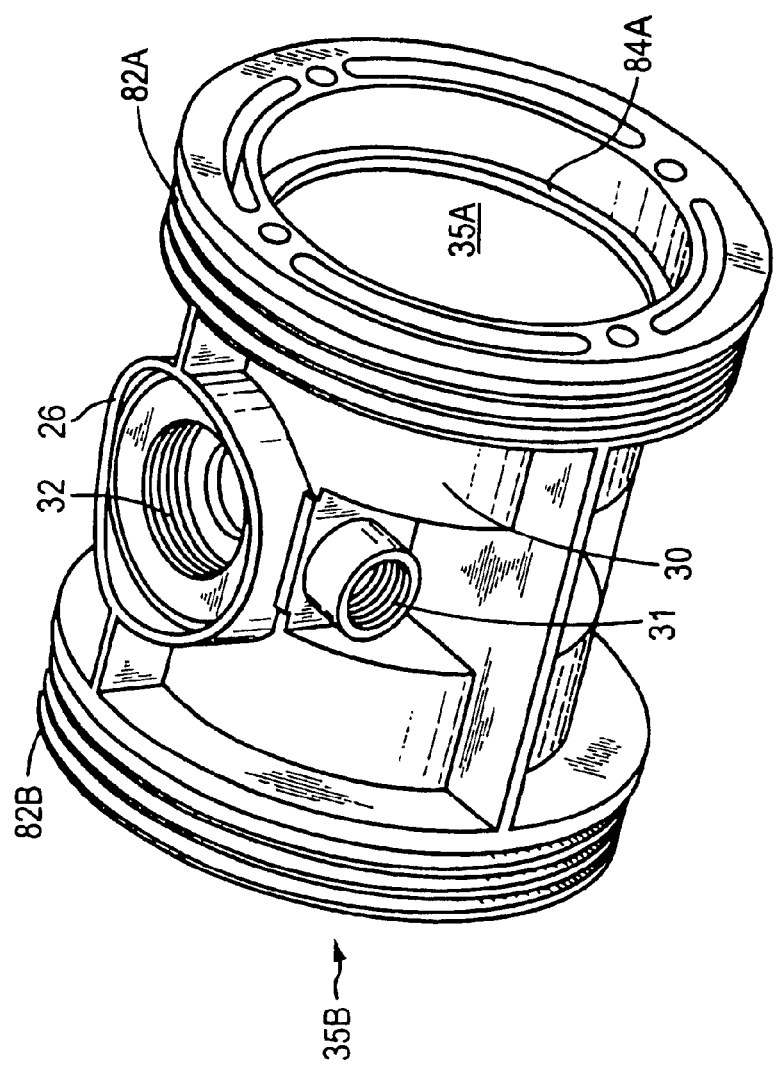
FIG. 2A is a perspective view of the body of the valve device shown in FIG. 2.

Referring to FIG. 2, valve device 10 includes an automatic actuator 25 and a manual actuator 27 for controlling simultaneously two diaphragm valves 28A and 28B. As shown in FIG. 2A, automatic actuator 25 (FIG. 2) is located at an actuator port 26 and is connected to threaded actuator port 32. Manual actuator 27 is connected to a manual port 31. Manual actuator 27 includes a manual override valve that resides in close proximity to automatic actuator 25 and is coupled in parallel to the pressure release mechanism (i.e. in parallel to the hydraulic passages) controlled by automatic actuator 25. Specifically, manual actuator 27 is connected to vent port 39, which is in communication with a passage 36, as described in connection with and shown in FIG. 3D. Manual actuator 27 provides a means for opening and closing of the two diaphragm valves 28A and 28B by controlling the pressure when loss of electrical power or other failure disables the automatic actuator.

Figure 3:
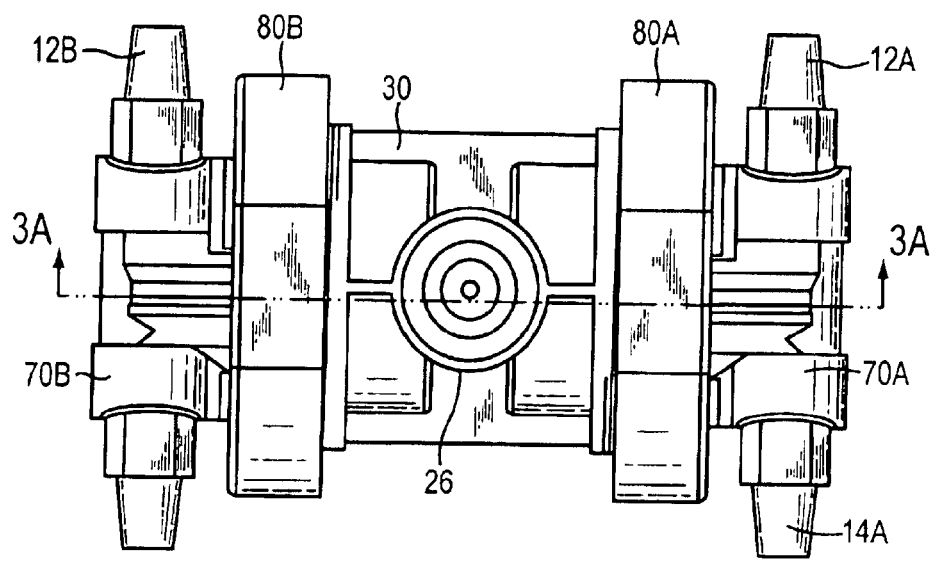
FIG. 3 is a top view of the valve device shown in FIG. 2.
Figure 3A:
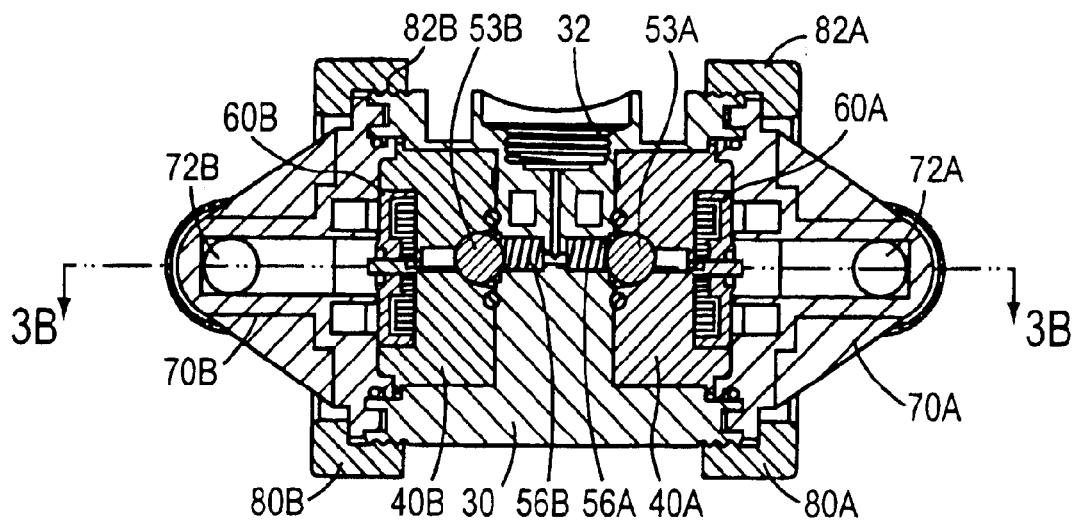
FIG. 3A is a cross-sectional view of the valve device shown along a line 3A—3A in FIG. 3.
Figure 3B:
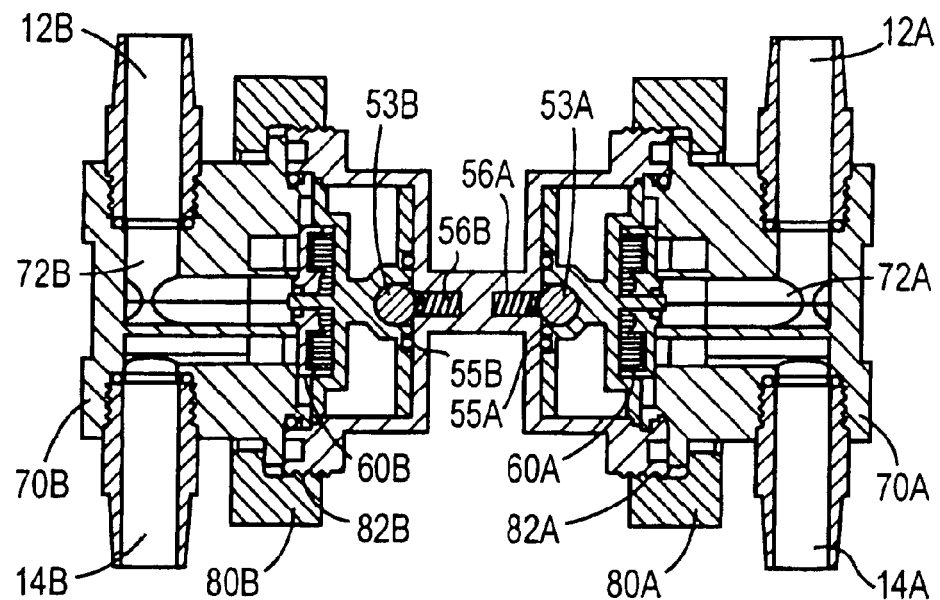
FIG. 3B is a cross-sectional view of the valve device shown along a line 3B—3B in FIG. 3A.

Referring to FIGS. 3 through 3B, valve device 10 is constructed to operate with a single solenoid (automatic actuator 25), which controls simultaneously two diaphragm valves 28A and 28B. Valve device 10 includes a main body 30, two diaphragm holders 40A and 40B, two diaphragms 60A and 60B, and two end caps 70A and 70B, attachable to main body 30 by respective rings 80A and 80B. Main body 30 (also shown in FIGS. 3C and 3D) includes a threaded actuator port 32 and control passages 34 and 36. Control passages 34 and 36 are used for controlling diaphragm valves 28A and 28B, which are arranged substantially symmetrically with respect to actuator port 32. In the following description, we describe in detail only diaphragm valve 28A since diaphragm valve 28B has a similar design and elements, as shown in FIGS. 3A and 3B.

Figure 4:
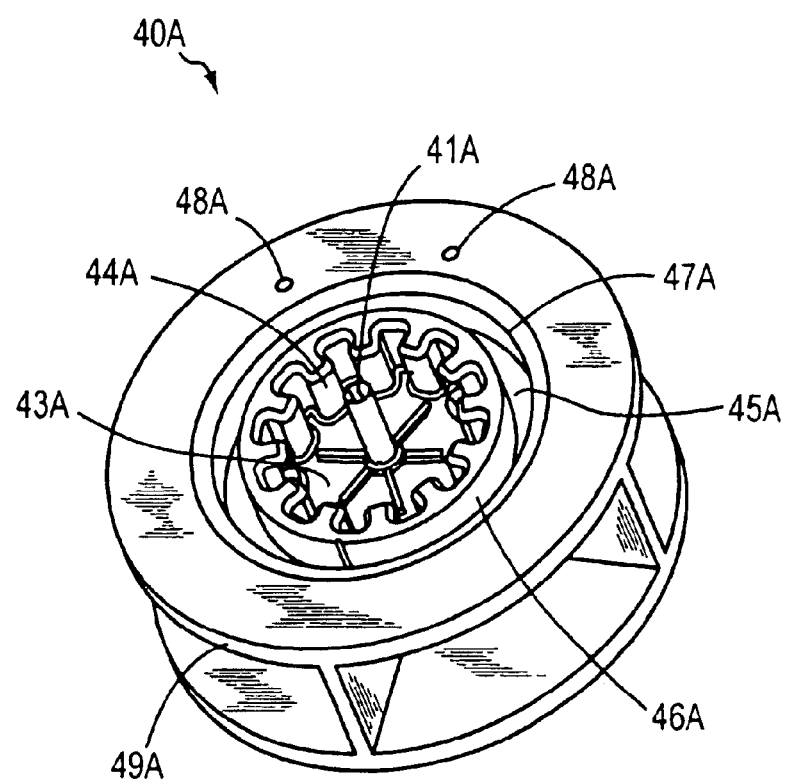
FIG. 4 is a perspective view of one of two diaphragm holders used in the valve device shown in FIGS. 2 and 3 through 3B.
Figure 4A:
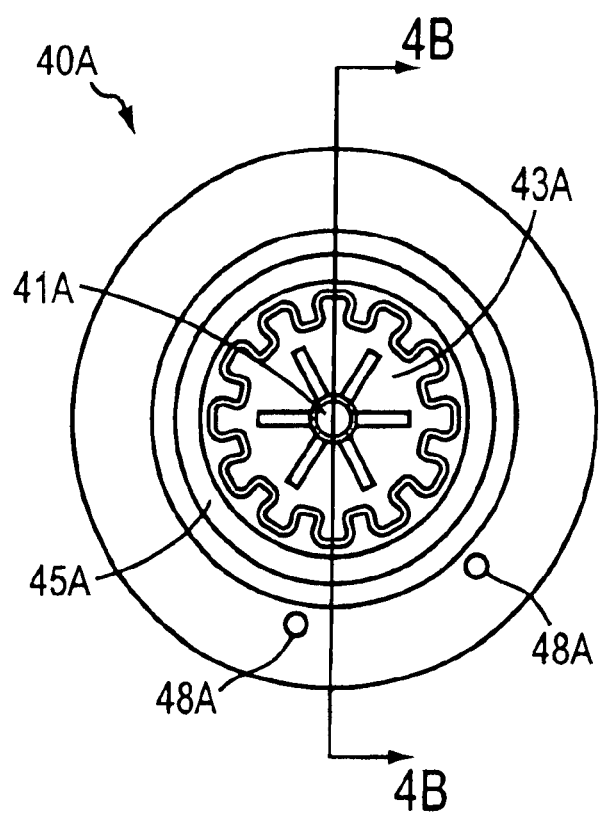
FIG. 4A is a top view of the diaphragm holder shown in FIG. 4A.
Figure 4B:
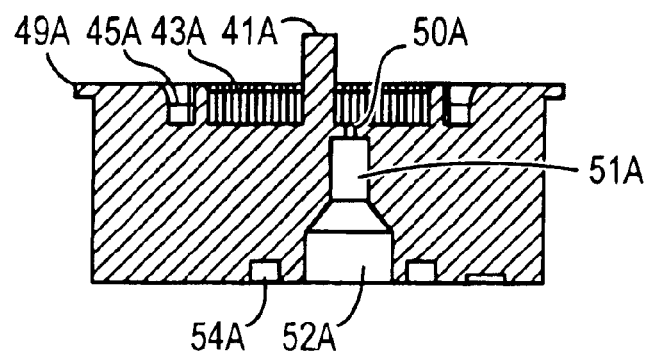
FIG. 4B is a cross-sectional view of the diaphragm holder shown along a line 4B—4B in FIG. 4A.

Referring to FIGS. 4, 4A and 4B, diaphragm holder 40A includes a guide pin 41A, a fluid chamber 43A, a groove 45A, formed by an inner cylindrical wall 46A and an outer cylindrical wall 47A, and a circular edge 49A. Fluid chamber 43A includes walls 44A disposed symmetrically around guide pin 41A. Inner and outer cylindrical walls 46A and 47A are disposed concentrically about guide pin 41A. Guide pin 41A includes a groove 42A for providing a fluid passage 68A described in connection with FIG. 6A. Diaphragm holder 40A also includes a control passage 50A, a ball seat 52A, and an o-ring groove 54A. Control passage 50A is constructed to receive a spring 51A (not shown in FIG. 3A).

Figure 3C:
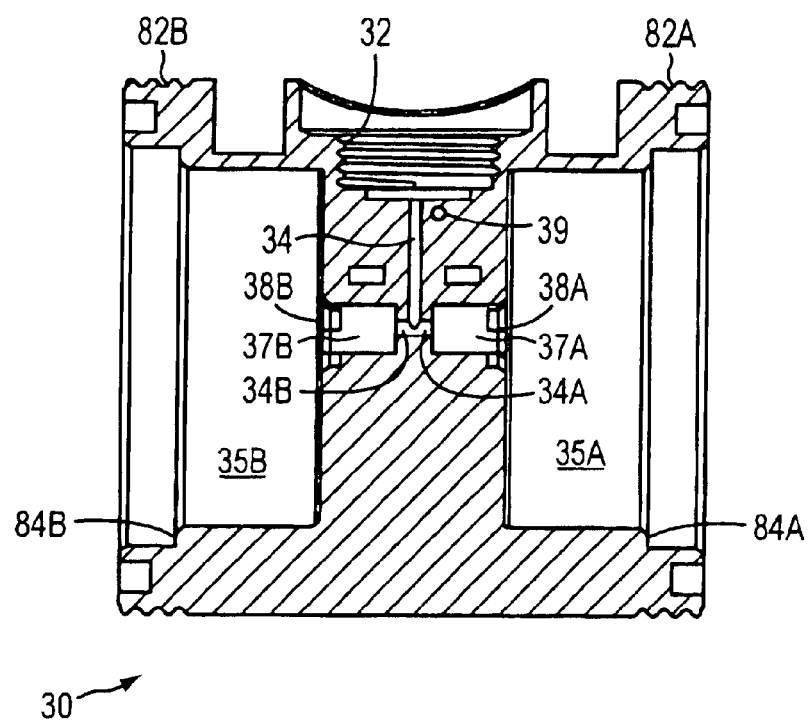
FIG. 3C is a cross-sectional view showing in detail only a main body of the valve device shown in FIG. 3A.
Figure 3D:
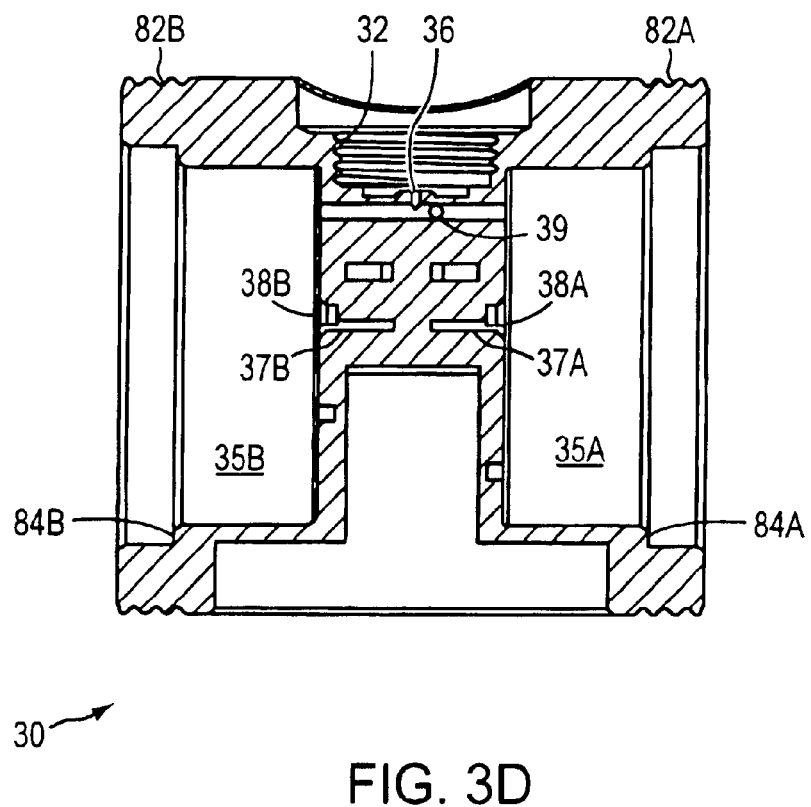
FIG. 3D is another cross-sectional view showing in detail only the main body of the valve device.

FIGS. 3C and 3D are two parallel cross-sectional views of main body 30. Main body 30 receives diaphragm holders 40A and 40B inside cavities 35A and 35B, respectively. Main body also includes ball seats 38A and 38B. Ball seat 38A and ball seat 52A (FIG. 4B) are arranged to include a rubber ball 53A located between diaphragm holder 40A and main body 30. Ball seat 38B and ball seat 52B are arranged to include a rubber ball 53B located between diaphragm holder 40B and main body 30. Referring also to FIG. 4B, control passage 50A and a larger control passage 51A are positioned in communication with rubber ball 53A. Control passages 34, 34A and 34B are in communication with bores 37A and 37B, which receive springs 56A and 56B located inside and positioned in contact with rubber balls 53A and 53B, respectively.

Diaphragm holder 40A includes circular surface 49A, which rests on a surface 84A (FIG. 2), and an O-ring 55A (FIG. 3B), located in O-ring groove 54A, which provides a seal between diaphragm holder 40A and main body 30. Similarly, an O-ring 55B provides a seal between diaphragm holder 40B and main body 30. Threaded rings 80A and 80B are tightened over threaded surfaces 82A and 82B, respectively (FIG. 3).

Referring specifically to FIGS. 4A and 4B, control passages 50A and 51A communicate with fluid chamber 43A, which is used for valve control. Diaphragm holder 40A confines diaphragm 60A (FIGS. 6 and 3A), positioned between diaphragm holder 40A and end cap 70A, as described below. Diaphragm holder 40B includes substantially the same elements as diaphragm holder 40A and performs substantially the same function. The elements of diaphragm holder 40B are referred to by the same number in combination with the letter "B". When diaphragm holders 40A and 40B are assembled together with main body 30, springs 56A and 56B (located inside the respective passages 37A and 37B) and rubber balls 53A and 53B form check valves that prevent water cross-flow between diaphragm valve 28A and diaphragm valve 28B. Other types of check valves may also be used.

Figure 5:
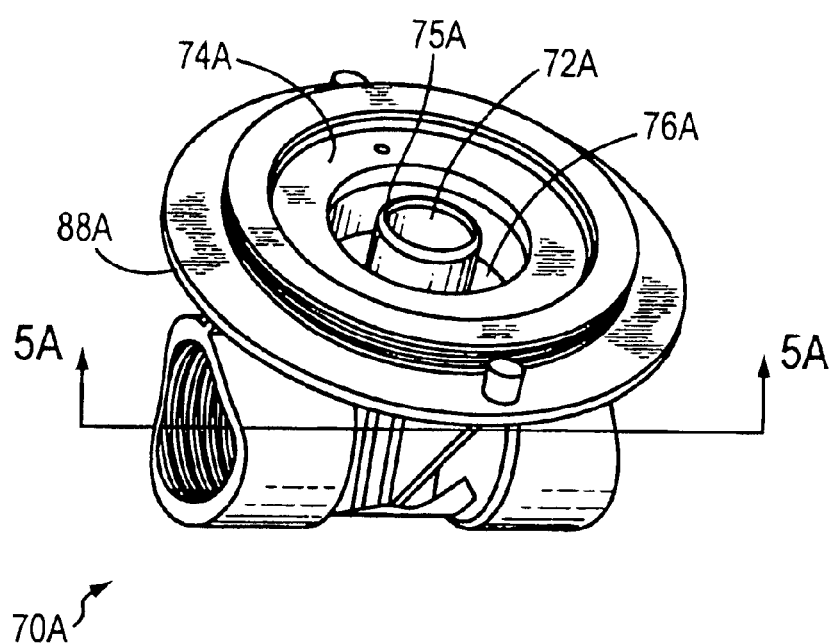
FIG. 5 is a perspective view of one of two end caps used in the valve device shown in FIGS. 2 and 3 through 3B.
Figure 5A:
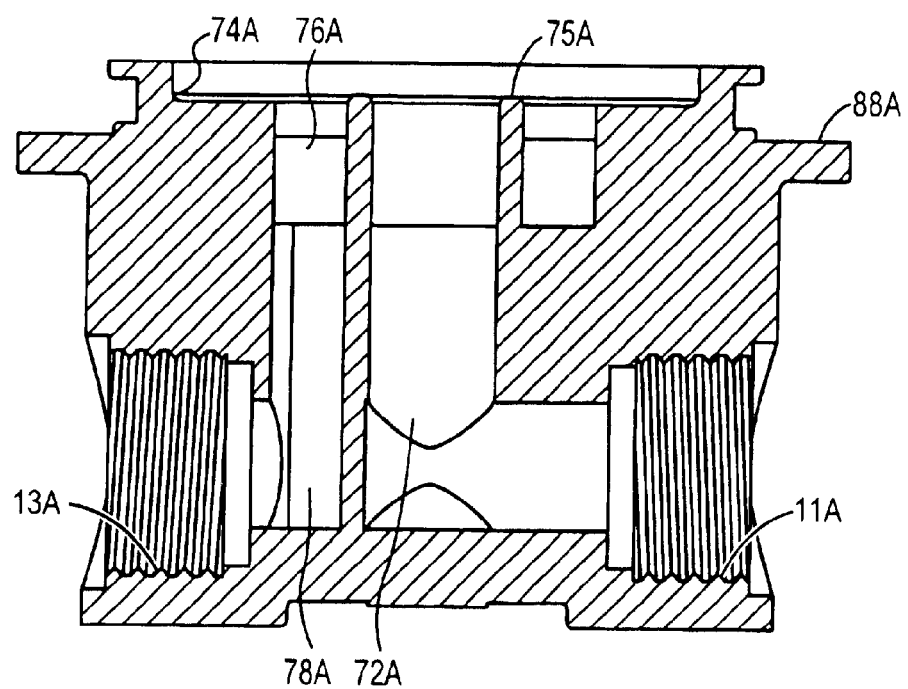
FIG. 5A is a cross-sectional view of the end cap shown along a line 5A—5A in FIG. 5.

Since end caps 70A and 70B have substantially the same construction, both end caps will be described by referring only to end cap 70A. Referring to FIGS. 5 and 5A, end cap 70A includes a threaded input port 11A, a threaded output port 13A, an input passage 72A, a diaphragm seat 74A, a raised annular lip 75A and a coaxially extending channel 76A leading from diaphragm seat 74A to an annular output chamber 78A. Raised annular lip 75A is formed axially with respect to input passage (i.e., fluid conduit) 72A and is used for sealing passage 72A. Input port 11A and input passage 72A provide fluid up to diaphragm membrane 60A. Coaxially extending channel 76A and annular output chamber 78A are designed to provide fluid to and discharge the fluid through output port 13A. End cap 70B includes substantially the same elements as end cap 70A and performs substantially the same function.

Figure 6:
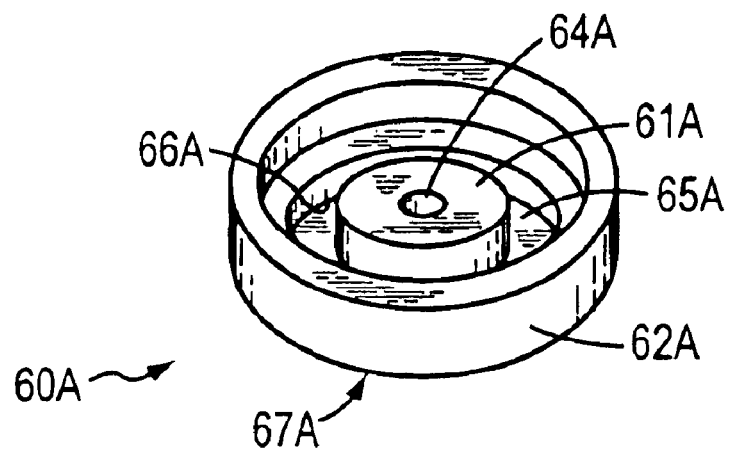
FIG. 6 is a perspective view of a diaphragm used in the valve device shown in FIGS. 3A and 3B.
Figure 6A:
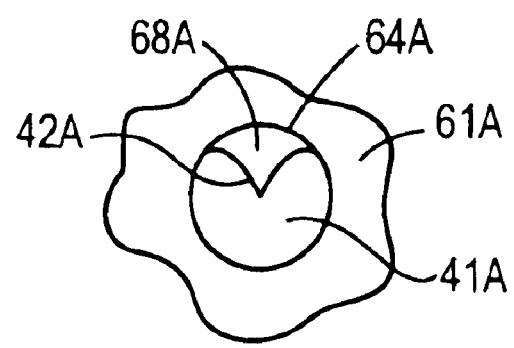
FIG. 6A is a detailed cross-sectional view of the center of the diaphragm shown in FIG. 6.

Referring to FIG. 6, diaphragm 60A is made from a suitable elastomeric material and includes an inner, stiffer hub section 61A, an outer ring-like section 62A, and a central opening (hole) 64A for receiving therethrough guide pin 41A, shown in FIG. 3A. Referring also to FIG. 6A, guide pin 41A includes V-groove 42A, which together with opening 64A forms a fluid passage 68A that enables fluid flow from input passage 72A to fluid chamber 43A (FIG. 4) during the valve operation.

Hub section 61A is interconnected to a flexible, radially extending membrane 65A, which in turn is connected to up-standing, radially outwardly disposed, cylindrical ring 62A. Central opening 64A is the only hole through diaphragm 60A. Diaphragm holder 40A receives ring section 62A of diaphragm 60A in compression and thereby retains the interfitted wall of ring section 62A inside annular groove 45A, in a resilient, preloaded elastomeric manner. Radially extending membrane 65A includes a first surface 66A directed toward chamber 43A and second surface 67A directed toward input passage 72A. Diaphragm 60A and end cap 70A are cooperatively constructed so that, when located on diaphragm holder 40A, second surface 67A of diaphragm 60A can seal input passage 72A at annular lip 75A (FIG. 5A). Diaphragm 60B includes substantially the same elements as diaphragm 60A and performs substantially the same function.

The entire operation of valve device 10 is controlled by a single actuator (not shown in the drawings) that includes a solenoid, such as the bistable solenoid model no. AXB724 available from Arichell Technologies Inc., West Newton, Mass. In general, a number of solenoid valves may be used such as described in U.S. Pat. No. 4,225,111. An alternative bistable solenoid is described in U.S. Pat. No. 5,883,557 or 5,599,003. The bistable solenoid includes a solenoid coil that energizes a plunger for closing or opening vent passage 36. The plunger includes a wear resistant plunger tip, preferably made of elastomeric material constructed to seal passages 34 and 36.

Referring to FIGS. 1, 3A and 3B, water enters from input pipe 12A into input passage 72A, which is sealed by diaphragm surface 67A, in the closed state, except for the passage 68A (FIG. 6A). A small amount of water flows through passage 68A and fills chamber 43A, which is sealed in the closed state. Thus, diaphragm 60A resists the pressure caused by the input water line 12A because passage 68A allows substantial pressure equalization to occur between input passage 72A and fluid chamber 43A. Diaphragm 60A is shaped to have first surface 66A larger than second surface 67A located in contact with the input water passage 72A. Therefore, assuming about the same fluid pressure in input passage 72A and in fluid chamber 43A, membrane 65A provides a net force toward input passage 72 and seals this passage at lip 75A. That is, the force difference keeps the valve closed.

To open diaphragm valve 28A, a pressure-relief mechanism described below relieves the pressure in the pilot chamber, i.e., fluid chamber 43A. For example, a bistable solenoid energizes and retracts a plunger that seals passage 36. Thus, after retracting, the plunger relieves the water pressure in chamber 43A causing a net force directed toward chamber 43A and thus a movement of membrane 65A (of diaphragm 60A) toward chamber 43A. That is, second surface 67A of diaphragm 60A no longer presses against lip 75A and thus no longer seals input passage 72A at lip 75A. Water flows from input passage 72A around lip 75A through the set of coaxially extending channels created in communication with output chamber 78A.

Simultaneously with pressure drop in fluid chamber 43A, there is a pressure drop in fluid chamber 43B of diaphragm valve 28B, which operates substantially the same way as diaphragm 28A. The pressure drop in chamber 43B causes a net force directed toward chamber 43B and thus the second surface of diaphragm 60B no longer seals input water line 12B and input passage 72B. Therefore, water flows from input passage 72B around a lip (identical to lip 75A) through the set of coaxially extending channels created in communication with an output chamber 78B. Thus both valves are in the open state.

In the open state, fluid flows from fluid chamber 43A through diaphragm holder passages 50A and 51A, around ball 53A located in seat 52A and through passages 37A and 34 shown in FIG. 3C. The check valve, including balls 53A and 53B and springs 56A and 56B, prevents this fluid from flowing to the diaphragm holder passages on the other side. around ball 53B. Referring to FIGS. 3C and 4B, passage 51A is about 0.015 inch, passages 37A and 37B are about 0.164 inch, passages 34A and 34B are about 0.015 inch and passage 34 is about 0.050 inch. These passage sizes enable pressure isolation between valves 28A and 28B and also enable operation at large pressure differentials. Also referring to FIG. 3D, in the open state, fluid flows from passage 34 through passage 36 and through another passage in the body of diaphragm holders 40A and 40B. Diaphragm holder 40A includes ports 48A, which provides this fluid to annular chamber 76A. Diaphragm holder 40A includes a port 42A for venting fluid during the open state of manual actuator 27.

To close diaphragm valves 28A and 28B, a bistable solenoid moves a plunger to seal passages 34 and 36. Water from input pipe 12A flows into input passage 72A and flows inside passage 68A (FIG. 6A) to fluid chamber 43A. After fluid chamber 43A is filled, the pressure is substantially equalized between input passage 72A and fluid chamber 43A. As described above, assuming about the same fluid pressure in input passage 72A and in fluid chamber 43A, membrane 65A provides a net force toward input passage 72 and seals this passage at lip 75A. Similarly, membrane 67B of diaphragm 60B seals the water input and prevents water flow from line 12B to line 14B.

The opening and closing of valves 28A and 28B is controlled by a single actuator that seals fluid chambers 43A and 43B, or decreases the pressure in fluid chambers 43A and 43B. The lead time for closing or opening the valves depends also on the stiffness of membranes 65A and 65B, and is preferably about 40 msec. to 60 msec. In general, valves 28A and 28B are designed to avoid the water hammer effect during opening or closing.

Alternatively, valve device 10 may include three or more diaphragm valves for controlling flow through three fluid conduits. For example, valve device 10 may have the main body constructed to receive three diaphragm holders located 90 degrees with respect to each other (rather than two diaphragm holders aligned 180 degrees as shown in FIGS. 3 through 3B). Each of the three diaphragm holders would then receive a diaphragm and an end cap as described above. Alternatively, two diaphragm valves may be arranged in series with each other so that, in stages, a smaller diaphragm actuates a larger diaphragm.

Alternatively, valve device 10 includes other types of valves actuated by a single automatic or manual actuator. These valves may be a piston valve, a needle valve, a gate valve, a globe valve, or a butterfly valve. In general, the actuator may actuate two different types of valves.

Figure 7:
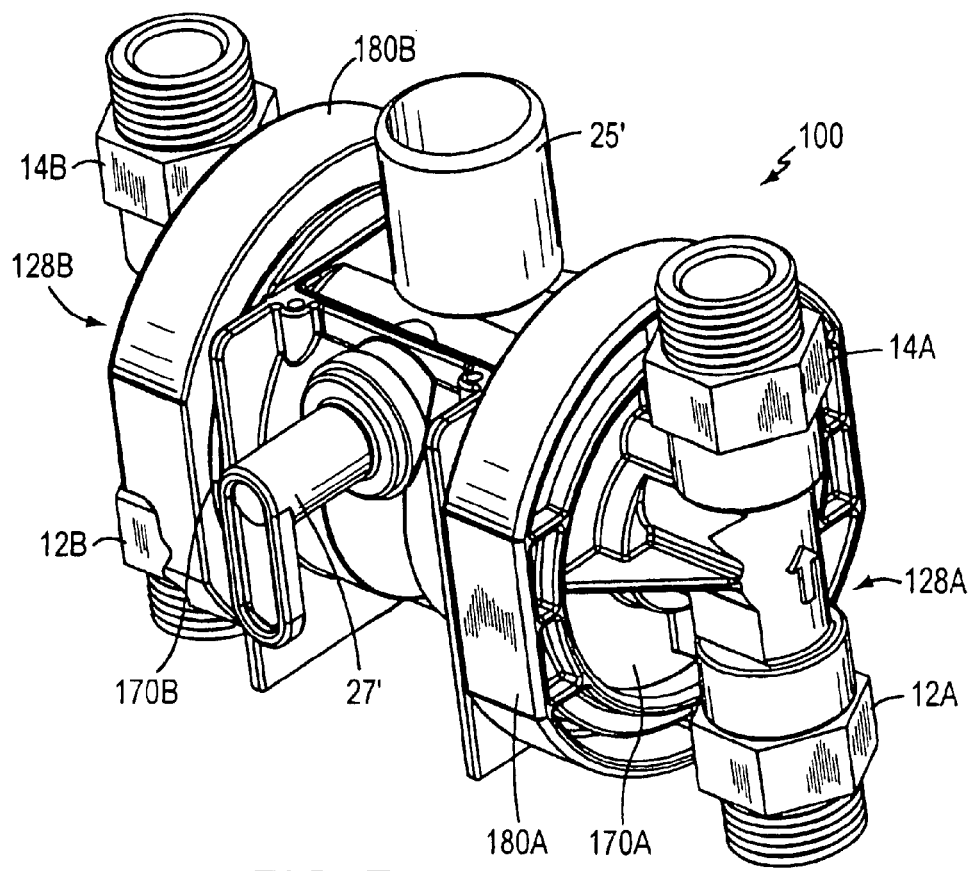
FIG. 7 is a perspective view of another embodiment of the valve device for controlling fluid flow in at least two fluid conduits.

FIG. 7 illustrates the preferred embodiment of a valve device used for controlling fluid in two conduits. Valve device 100 includes an automatic actuator 25' and a manual actuator 27' for controlling two diaphragm valves 128A and 128B. Diaphragm valves 128A and 128B control separately flow of fluid in two separate fluid lines between the respective input ports 12A and 12B and output ports 14A and 14B. Automatic actuator 25' may be a latching solenoid (e.g., a solenoid described in U.S. Pat. No. 6,293,516, which is incorporated by reference), or may be a non-latching solenoid (e.g., a solenoid described in U.S. Pat. No. 6,305,662, which is incorporated by reference).

Similarly as for valve device 10 (FIG. 2), automatic actuator 25' is located at an actuator port 130 and is connected to threads 131, shown also in FIG. 7B. Manual actuator 27' is located at an actuator port 130' and is connected to threads 128. Manual actuator 27' is designed to open and close diaphragm valves 128A and 128B by controlling pressure when loss of electrical power or other failure disables automatic actuator 25'. Specifically, manual actuator 27' is connected to a vent port, which is in communication with actuator port 130, as described in connection with FIGS. 8A, 8B and 8D.

Figure 7A:
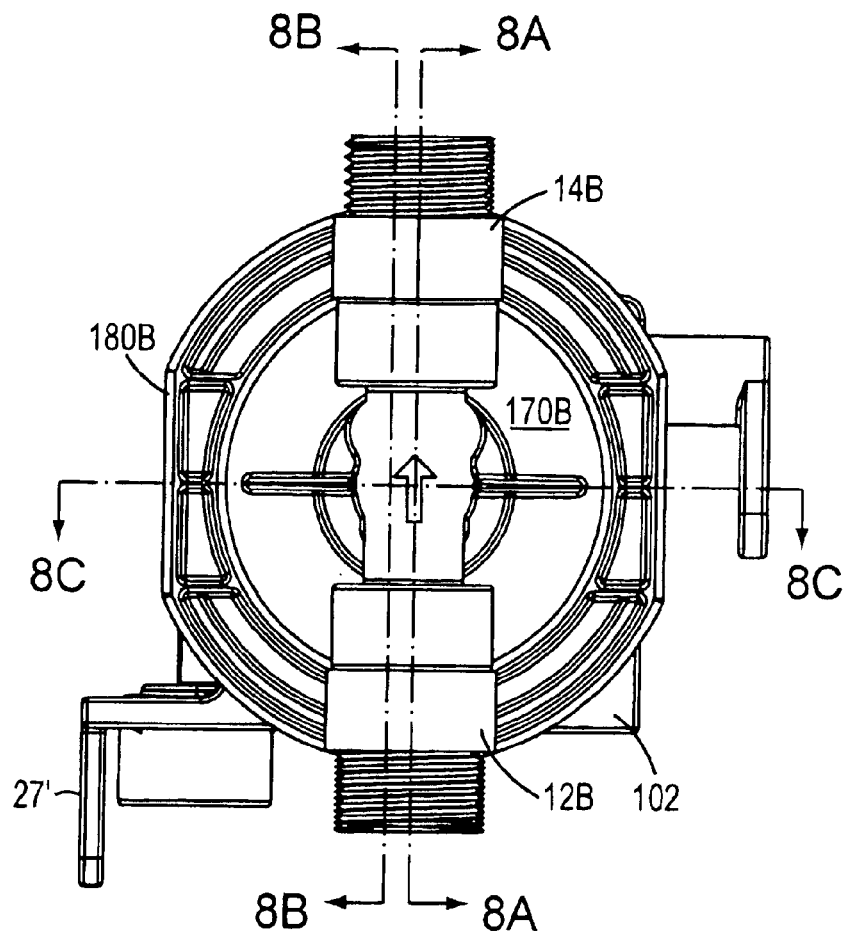
FIG. 7A is a side view of the valve device shown in FIG. 7.
Figure 10:
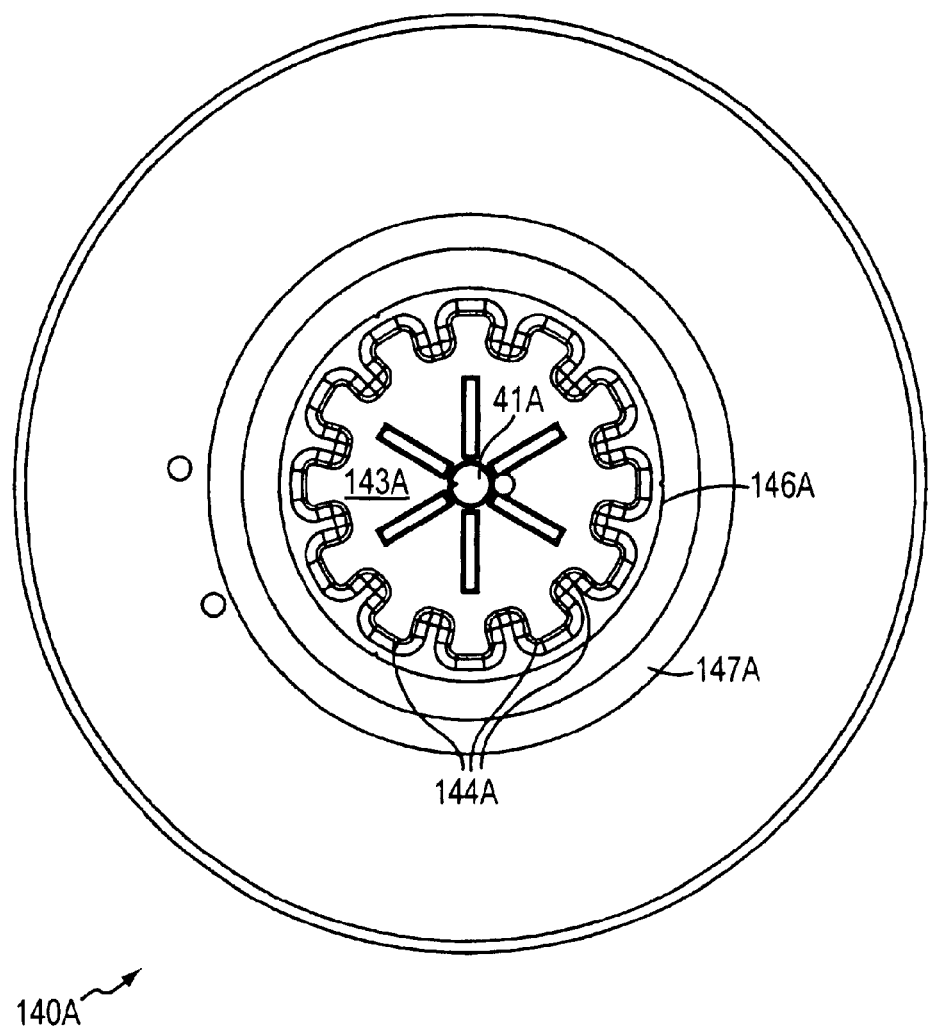
FIG. 10 is a plain view of one of two diaphragm holders used in the valve device shown in FIG. 7.
Figure 10A:
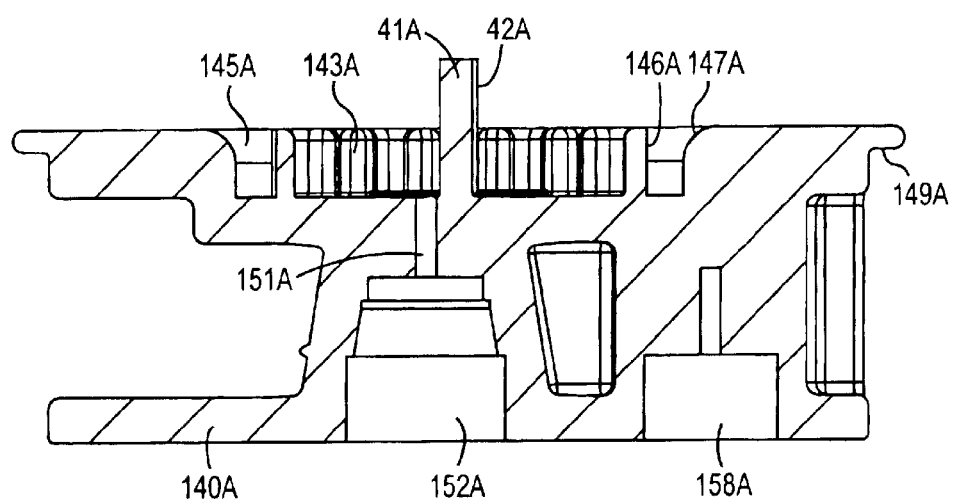
FIG. 10A is a cross-sectional view of the diaphragm holder shown in FIG. 10 along a line 10A—10A.
Figure 11:
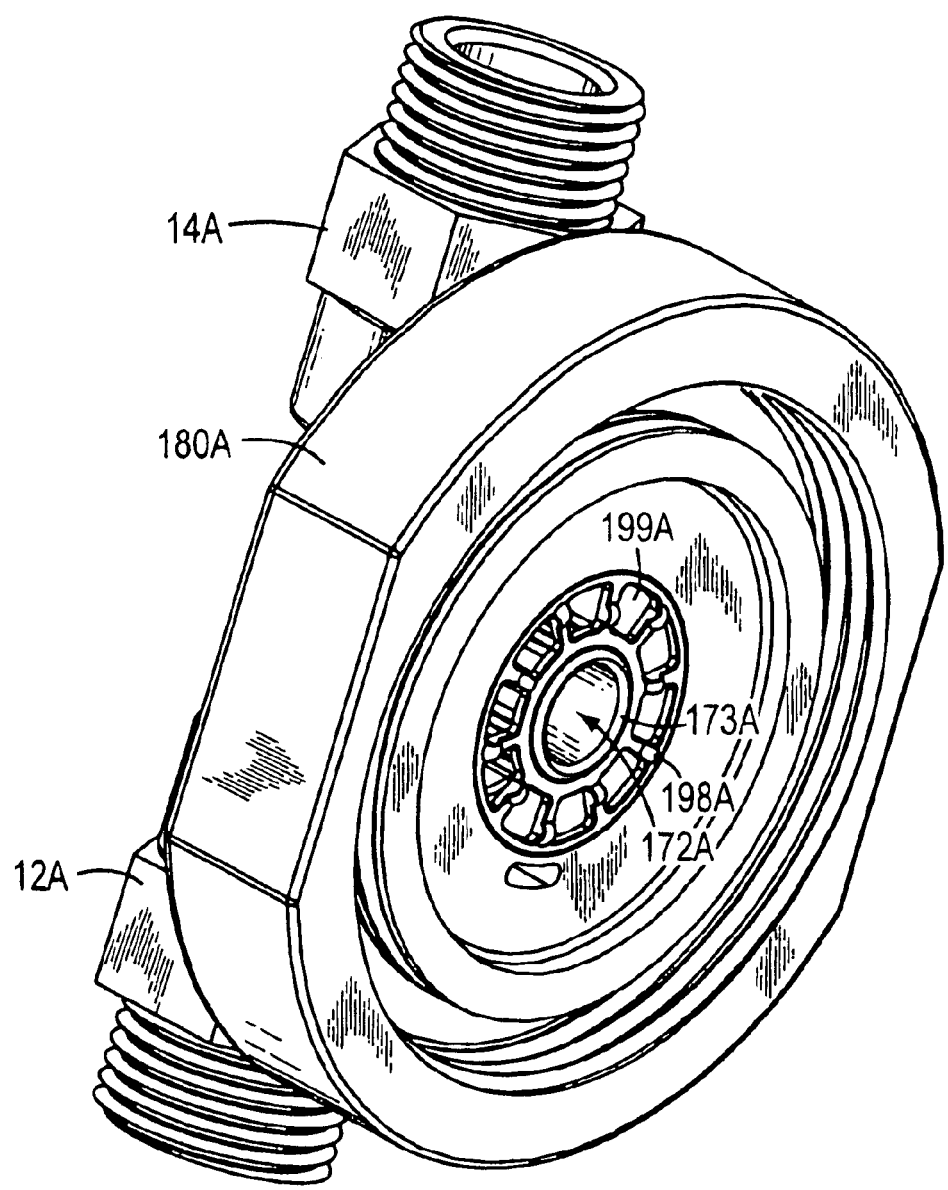
FIG. 11 is a perspective view of one of two end caps used in the valve device shown in FIG. 7.
Figure 11A:
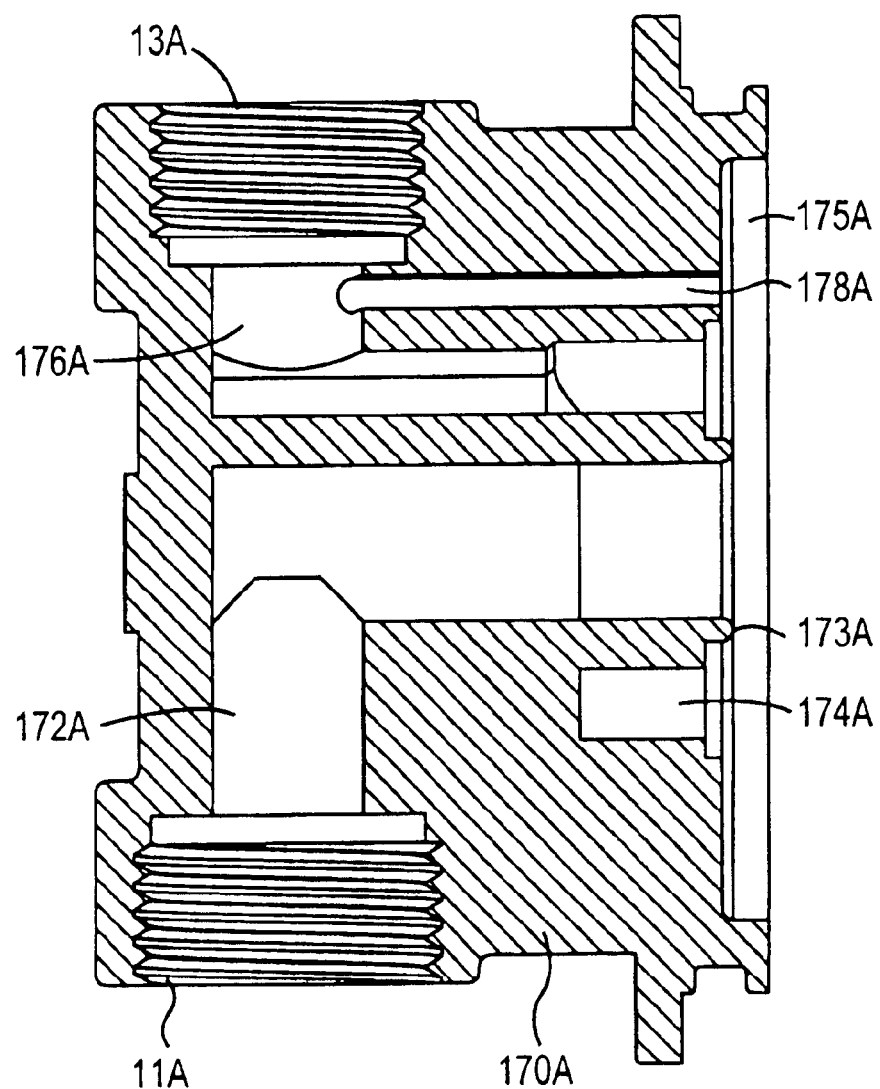
FIG. 11A is a cross-sectional view of the end cap shown in FIG. 11.

Referring to FIGS. 7, 7A and 7B, valve device 100 includes a main body 102 (also shown in FIGS. 9A and 9B), two diaphragm holders 140A and 140B (shown in FIGS. 10 and 10A), two diaphragms 60A and 60B (shown in FIGS. 6 and 6A), and two end caps 170A and 170B (shown in FIGS. 11 and 11A). Diaphragms 60A and 60B, described in detail above in connection with in FIGS. 6 and 6A, are placed on diaphragm holders 140A and 140B, which are somewhat similar to diaphragm holders 40A and 40B described in connection with FIGS. 4, 4A and 4B. Importantly, diaphragm holders 140A and 140B are co-operatively constructed and arranged with main body 102 to include four check valves. That is, there are two diaphragm check valves 150A and 150B, and two drain check valves 160A and 160B. The check valves prevent fluid mixing between the two fluid lines, or prevent back flow of fluid from one fluid line (or valve) to the other fluid line (or valve) under different fluid pressure conditions.

Referring to FIGS. 7B, 8A through 9B, valve device 100 has main body 102 constructed to accommodate diaphragm holders 140A and 140B in cavities 135A and 135B, respectively. Furthermore, main body 102 includes threads 122A and 122B for attaching end caps 170A and 170B by respective rings 180A and 180B. Referring to FIG. 9A, main body 102 also includes insert seats 136A and 136B designed for inserts 138A and 138B shown in FIG. 8A. Insert seats 136A and 136B are in turn connected to diaphragm control passages 182A and 182B communicating with actuator port 130 at a seat 182. Also referring to FIG. 9B, main body 102 also includes insert seats 184A and 184B connected to passages 186, 186A and 186B and designed to receive check valves 160A and 160B, respectively.

Referring to FIGS. 10 and 10A, diaphragm holder 140A is designed to receive diaphragm 60A shown in FIG. 6. Diaphragm holder 140A includes a guide pin 41A with a groove 42A for providing a fluid passage as shown in FIG. 6A. Diaphragm holder 140A also includes a fluid chamber 143A, a groove 145A, formed by an inner cylindrical wall 146A and an outer cylindrical wall 147A. Fluid chamber 143A includes walls 144A disposed symmetrically around guide pin 41A. Also, inner and outer cylindrical walls 146A and 147A are disposed concentrically about guide pin 41A. Diaphragm holder 140A also includes a control passage 151A, a diaphragm check valve seat 152A, and a drain check valve seat 158A. Drain check valve seat 158A is in communication with a drain passage that bypasses diaphragm 60 and is connected to a cavity 175A of endcap 170A (FIG. 11A). Cavity 175A is in turn connected to a passage 178A leading to output 14B. The drain passage provides a means for draining fluid from diaphragm chamber 143A in the open state of valve 128A.

Figure 8A:
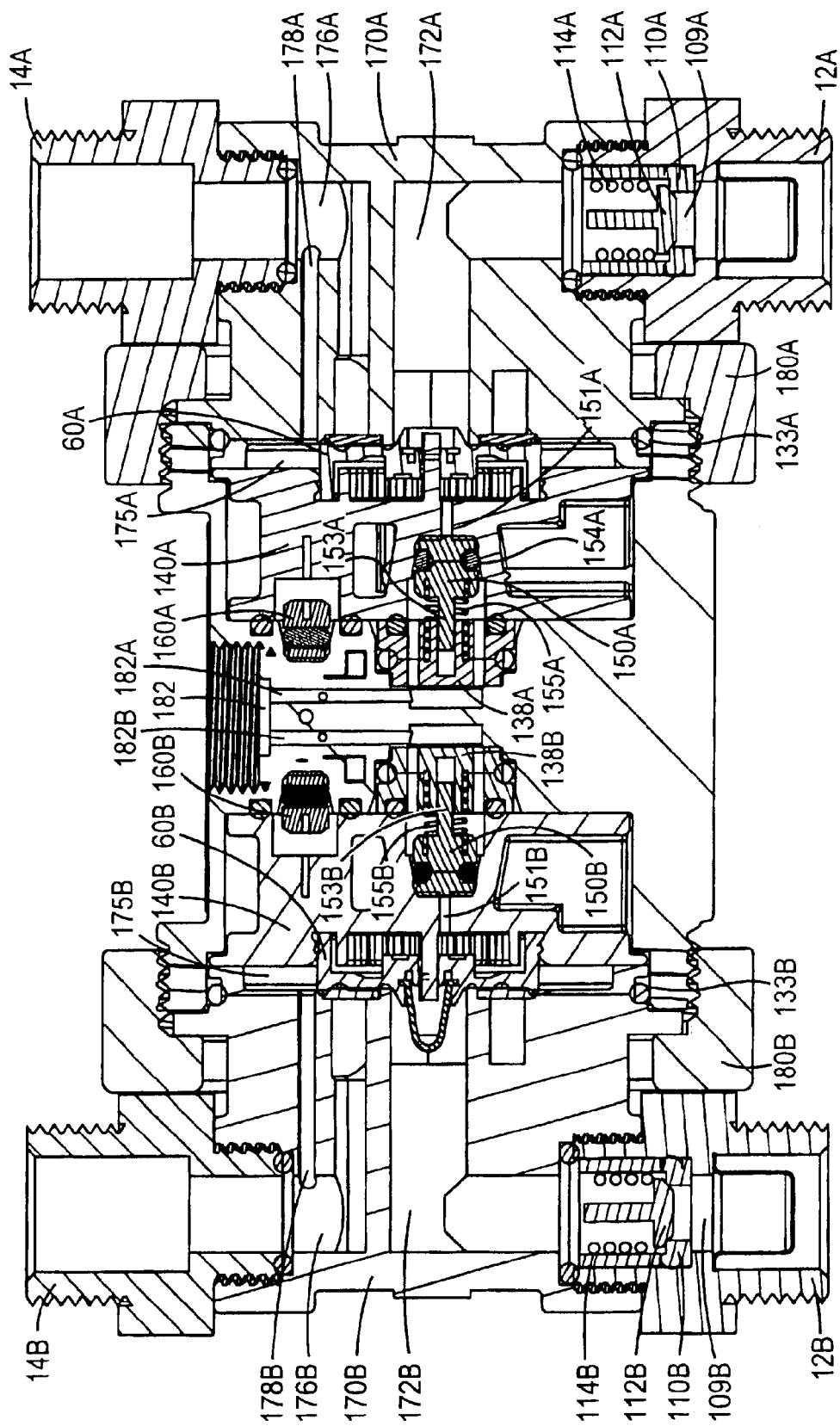
FIG. 8A is a cross-sectional view of the valve device shown along a line 8A—8A in FIG. 7A.
Figure 8B:
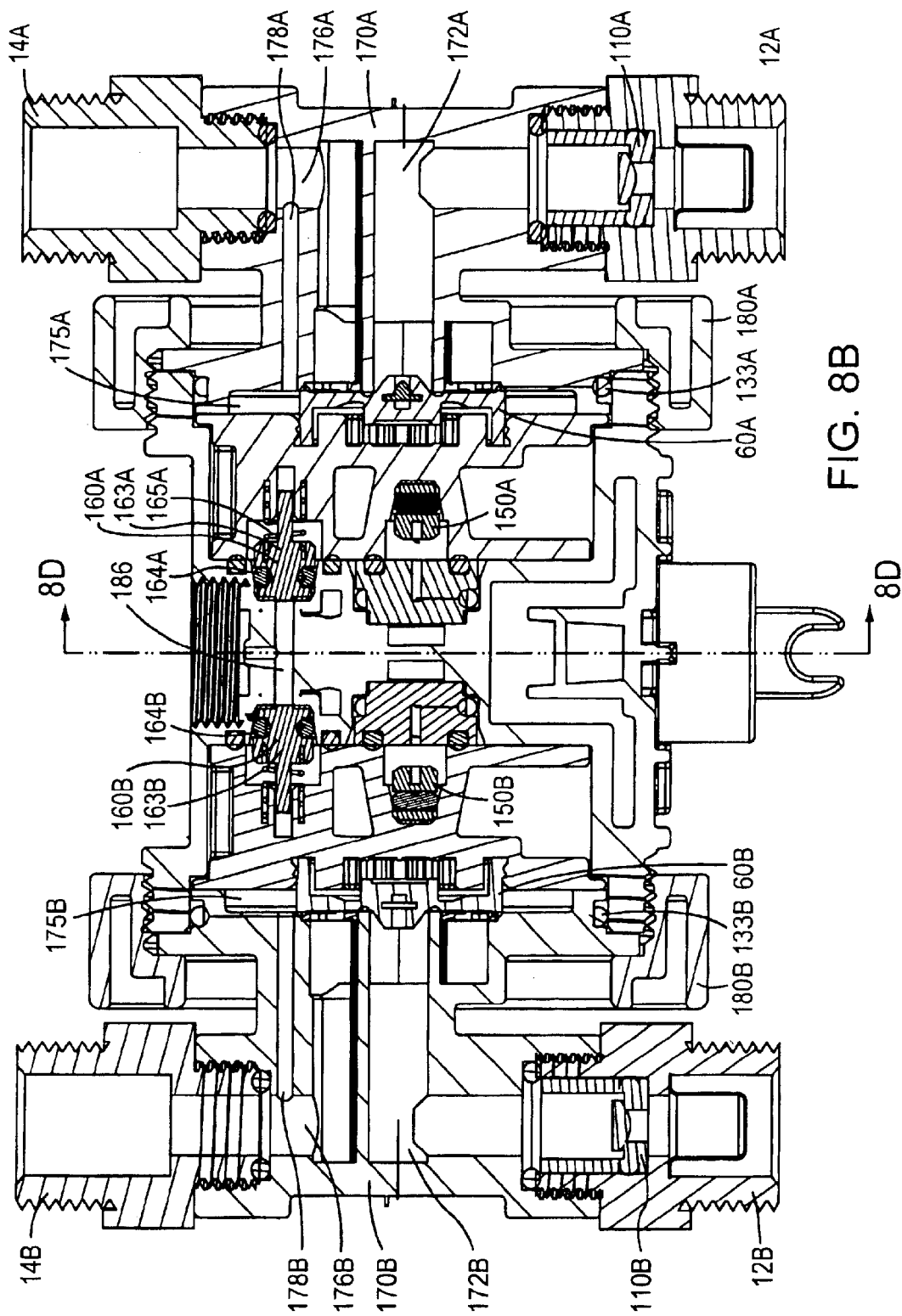
FIG. 8B is a cross-sectional view of the valve device shown along a line 8B—8B in FIG. 7A.
Figure 8C:
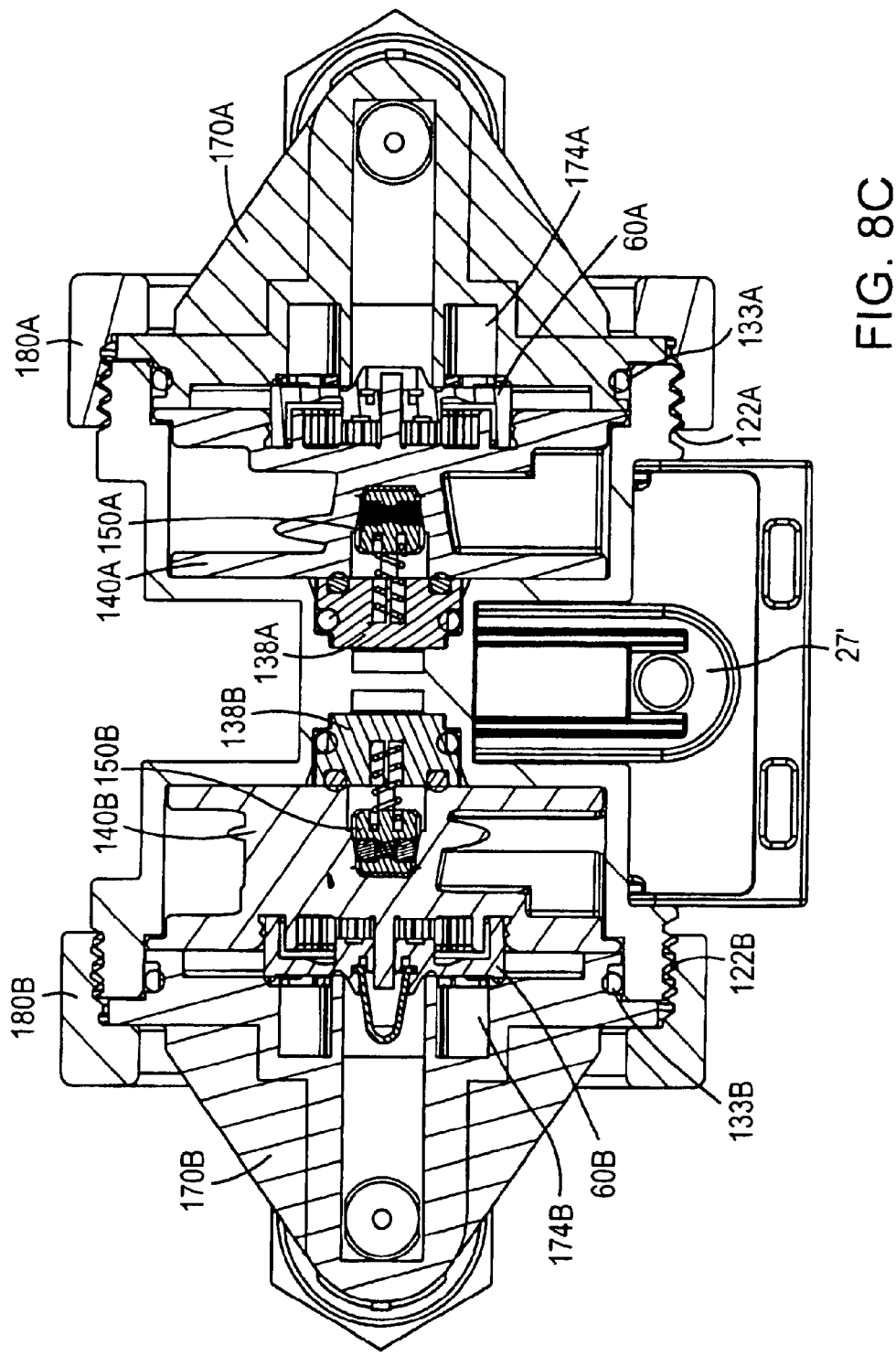
FIG. 8C is a cross-sectional view of the valve device shown along a line 8C—8C in FIG. 7A.

FIG. 7B is a perspective view of a main body 102 prior to assembling valve device 100. Cavities 135A and 135B receive diaphragm holders 140A and 140B, and then end caps 170A and 170B are attached using rings 180A and 180B, respectively. FIG. 7A is a side view of valve device 100 with all these elements installed. FIG. 8A is a cross-sectional view of valve device 100 shown along a line 8A—8A in FIG. 7A. FIG. 8B is a cross-sectional view of valve device 100 shown along a line 8B—8B in FIG. 7A. FIG. 8C is a cross-sectional view of valve device 100 shown along a line 8C—8C in FIG. 7A.

Figure 9A:
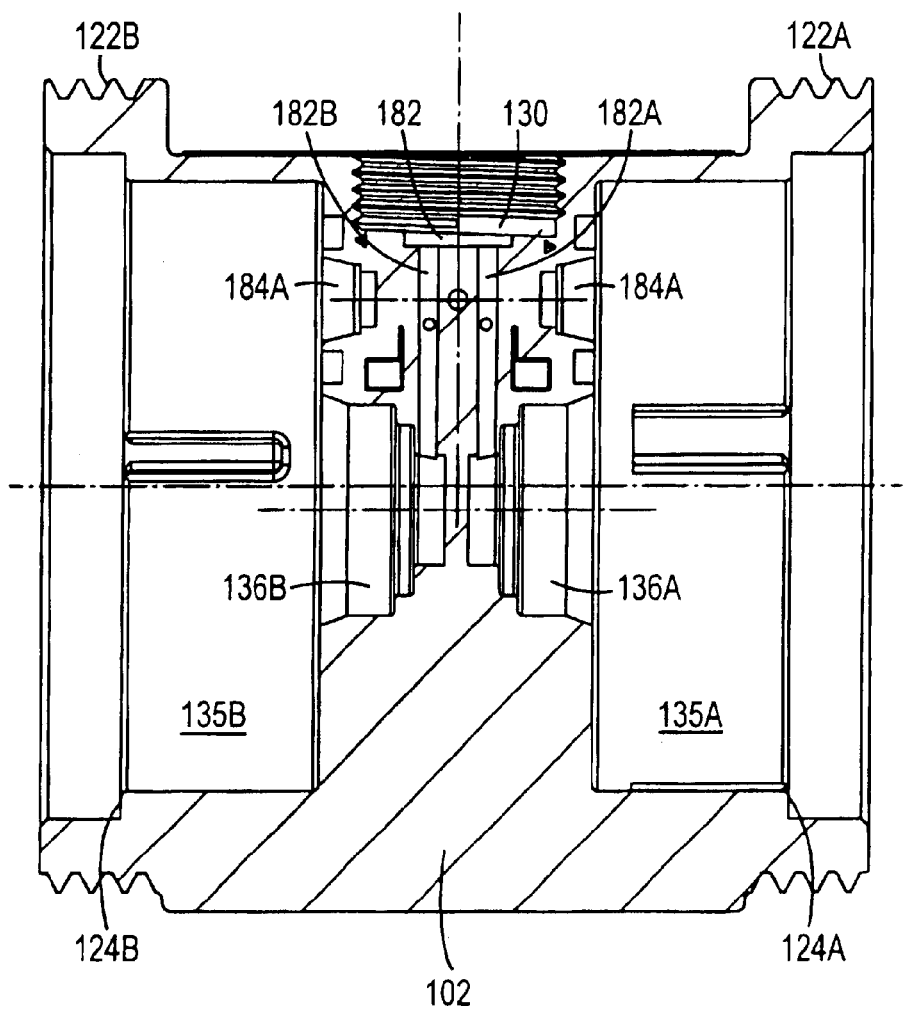
FIG. 9A is a cross-sectional view of the body of the valve device shown in FIG. 8A.
Figure 9B:
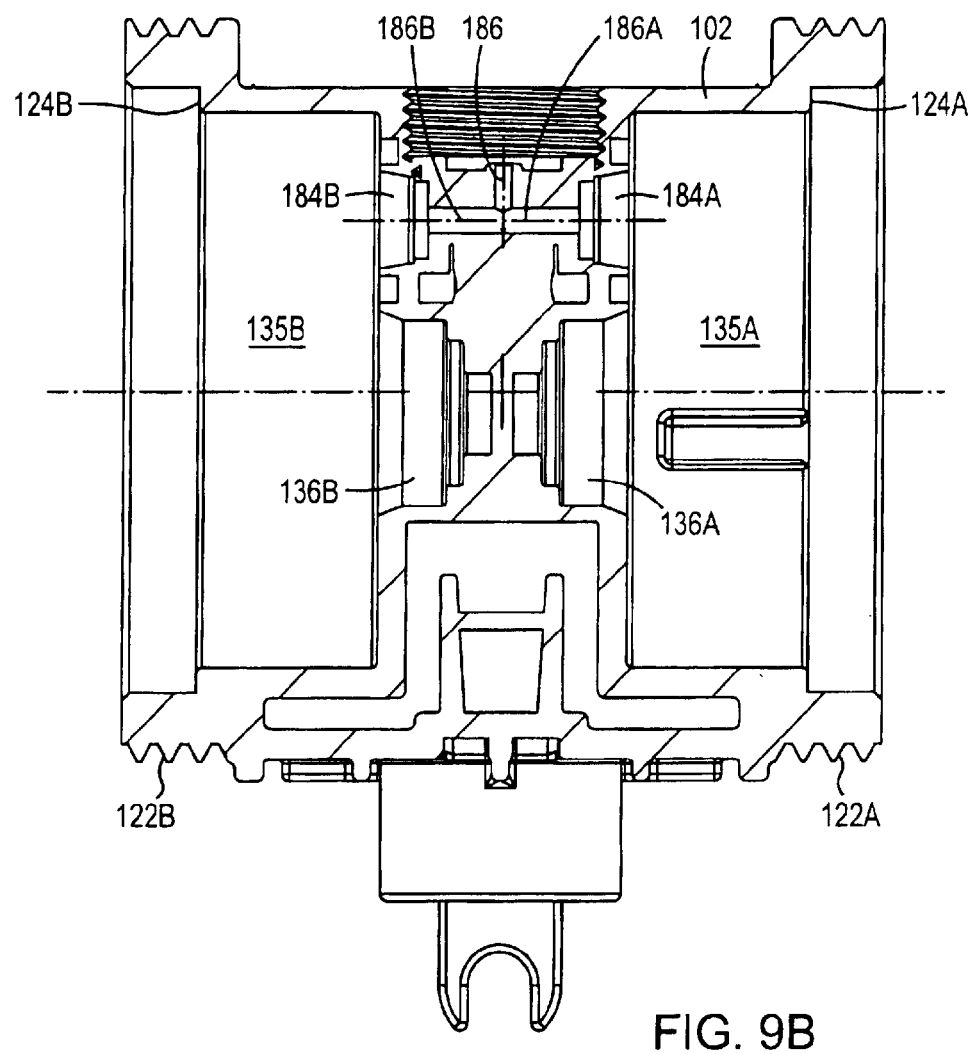
FIG. 9B is a cross-sectional view of the body of the valve device shown in FIG. 8B.

FIGS. 8A and 8B are parallel cross-sectional views that correspond to FIGS. 9A and 9B showing cross-sectional views of main body 102. Main body 102 receives, in cavities 136A and 136B, check valve inserts 138A and 138B, which are co-operatively arranged with check valves 150A and 150B. Each check valve includes a piston like structure with an O-ring and a spring co-operatively arranged with the corresponding insert. Specifically, check valve 150A includes a piston 153A with an O-ring 154A arranged to seal passage 151A under a force provided by a spring 155A. Also referring to FIG. 10A, diaphragm holder 140A includes check valve 160A located partially in cavity 158A and partially in cavity 184A (FIGS. 9A and 10A). As shown in FIG. 8B, check valve 160A includes a piston 163A with an O-ring 164A arranged to seal the passage leading to cavity 175A, under a force provided by biased spring 165A, which presses against the body of diaphragm holder 140A. Similarly, check valve 160B includes a piston 163B with an O-ring 164B arranged to seal the drain passage leading to passage 178B. Piston 163B is under a force provided by biased spring 165B.

Referring to FIG. 10A, diaphragm holder 140A includes a circular surface 149A arranged to rest on a surface 124A of main body 102, as shown in FIG. 9A. An O-ring 133A (FIG. 8A) provides a seal between diaphragm holder 140A and main body 102 when threaded ring 180A is tightened over threaded surface 122A (FIG. 9A). Similarly, an O-ring 133B provides a seal between diaphragm holder 140B and main body 102, when threaded ring 180B is tightened over threaded surface 122B.

Referring again to FIGS. 8A and 8B, input ports 12A and 12B include port check valves 110A and 110B, respectively. Port check valve 110A seals an input seat 109A and prevents fluid flow from fluid line (or side) "B" into fluid line 12A when there is a large pressure differential. Port check valve 110A includes a piston 112A and a spring 114A. Similarly, port check valve 110B seals an input seat 109B and prevents fluid flow from fluid line "A" into fluid line 12B when there is a large pressure differential. Port check valve 110B includes a piston 112B and a spring 114B, as shown in FIG. 8A.

Referring specifically to FIGS. 10 and 10A, valve seat 152A and control passages 151A communicate with fluid chamber 143A, which is used for valve control. Diaphragm holder 140A confines diaphragm 60A (FIG. 6) positioned between diaphragm holder 140A and end cap 170A. Diaphragm holder 140B includes substantially the same elements as diaphragm holder 140A. The elements of diaphragm holder 140B are referred to by the same number in combination with the letter "B". However, the location of diaphragm holders 140A and 140B is not interchangeable due to orientation of the venting passages leading to cavities 175A and 175B. When diaphragm holders 140A and 140B are assembled together with main body 102, check valves 150A and 150B prevent water cross-flow between diaphragm valve 128A and diaphragm valve 128B.

When there is significantly different pressure between the two fluid lines, check valves 160A and 160B prevent cross flow from one output (e.g., output 14B) to the other output (e.g. output 14A) via passages 186A and 186B (FIGS. 8B and 9B).

Since end caps 170A and 170B have substantially the same construction, both end caps will be described by referring only to end cap 170A. Referring to FIGS. 11 and 11A, end cap 170A includes threaded input port 11A, threaded output port 13A, an input passage 172A, a raised annular lip 173A, cavity 175A, and a coaxially extending channel 174A. Raised annular lip 173A is formed axially with respect to input passage (i.e., fluid conduit) 172A and is used for sealing passage 172A. Input port 12A and input passage 172A provide fluid up to diaphragm membrane 60A. End cap 170A also includes a metal or plastic plate 198A located around lip 173A. Plate 198A includes a set of openings 199A in communication with channel 174A. Coaxially extending channel 174A and annular output chamber 176A are designed to provide fluid to and discharge the fluid through output port 14A.

Operation of diaphragm 60A is described in connection with FIGS. 6 and 6A. Diaphragm 160A and end cap 170A are cooperatively constructed so that, when located on diaphragm holder 140A, second surface 67A of diaphragm 60A can seal input passage 172A at annular lip 173A (FIG. 11A). Therefore, fluid does not flow from passage 172A through openings 174 to annular chamber 76A. Diaphragm 60B includes substantially the same elements as diaphragm 60A and performs substantially the same function.

Referring to FIGS. 7, 8A, 8B and 8C, water (or other fluid) enters from input pipe 12A into input passage 172A, which is sealed by diaphragm surface 67A, in the closed state, except for the passage 68A (FIG. 6A). A small amount of water flows through passage 68A and fills chamber 143A, which is sealed in the closed state. Thus, diaphragm 60A resists the pressure caused by the input water line 12A because passage 68A allows substantial pressure equalization to occur between input passage 172A and fluid chamber 143A. Diaphragm 60A is shaped to have first surface 66A larger than second surface 67A located in contact with the input water passage 172A. Therefore, assuming about the same fluid pressure in input passage 172A and in fluid chamber 143A, membrane 65A provides a net force toward input passage 172A and seals this passage at lip 175A. That is, the force difference keeps the valve closed. Plate 198A limits the flexing of diaphragm 60A and prevents it from being forced into annular chamber 174A if there is a large force differential.

Referring to FIG. 8D, manual actuator 27' includes an actuator insert 190 having a piston seat 192 constructed and arranged to seal a passage 195. Actuator insert 190 also includes an o-ring 192 providing a seal to main body 102.

To open diaphragm valve 128A, a pressure-relief mechanism associated with actuator 25' or 27' relieves the pressure in the pilot chamber, i.e., fluid chamber 143A. For example, a bistable solenoid energizes and retracts a plunger that seals passage 186 (FIGS. 8B, 9B). Thus, after retracting, the plunger relieves the water pressure in chamber 143A causing a net force directed toward chamber 143A and thus a movement of membrane 65A (of diaphragm 60A) toward chamber 143A. That is, second surface 67A of diaphragm 60A no longer presses against lip 173A and thus no longer seals input passage 172A at lip 173A. Water flows from input passage 172A through the set of coaxially extending channels 199A created in communication with output chamber 176A (FIGS. 11 and 11A).

Simultaneously with pressure drop in fluid chamber 143A, there is a pressure drop in fluid chamber 143B of diaphragm valve 128B, which operates substantially the same way as diaphragm 128A. In the open state, fluid flows from fluid chamber 143A through diaphragm holder passages 151A, around check valve 150A located in seat 136A and through passage 182A to port 182 shown in FIGS. 8A and 9A. Also referring to FIG. 8B, in the open state, fluid flows from passage 186 through passage 186A or 186B and through the passage in the body of diaphragm holders 140A or 140B.

To close diaphragm valves 128A and 128B, a solenoid moves the plunger of automatic actuator 27' to seal passages 182A and B and 186. Alternatively, plunger 190 seals passage 195, which is in communication with seat 182, as shown in FIG. 8D. Water from input pipe 12A flows into input passage 172A and flows inside passage 68A (FIG. 6A) to fluid chamber 143A. After fluid chamber 143A is filled, the pressure is substantially equalized between input passage 172A and fluid chamber 143A. As described above, assuming about the same fluid pressure in input passage 172A and in fluid chamber 143A, membrane 65A provides a net force toward input passage 172A and seals this passage at lip 173A. Similarly, membrane 67B of diaphragm 60B seals the water input and prevents water flow from line 12B to line 14B.

The opening and closing of valves 128A and 128B is controlled by a single automatic or manual actuator that seals fluid chambers 143A and 143B, or decreases the pressure in fluid chambers 143A and 143B. The lead time for closing or opening the valves depends also on the stiffness of membranes 65A and 65B, and is preferably about 40 msec. to 60 msec. In general, valves 128A and 128B are designed to avoid the water hammer effect during opening or closing.

Figure 12:
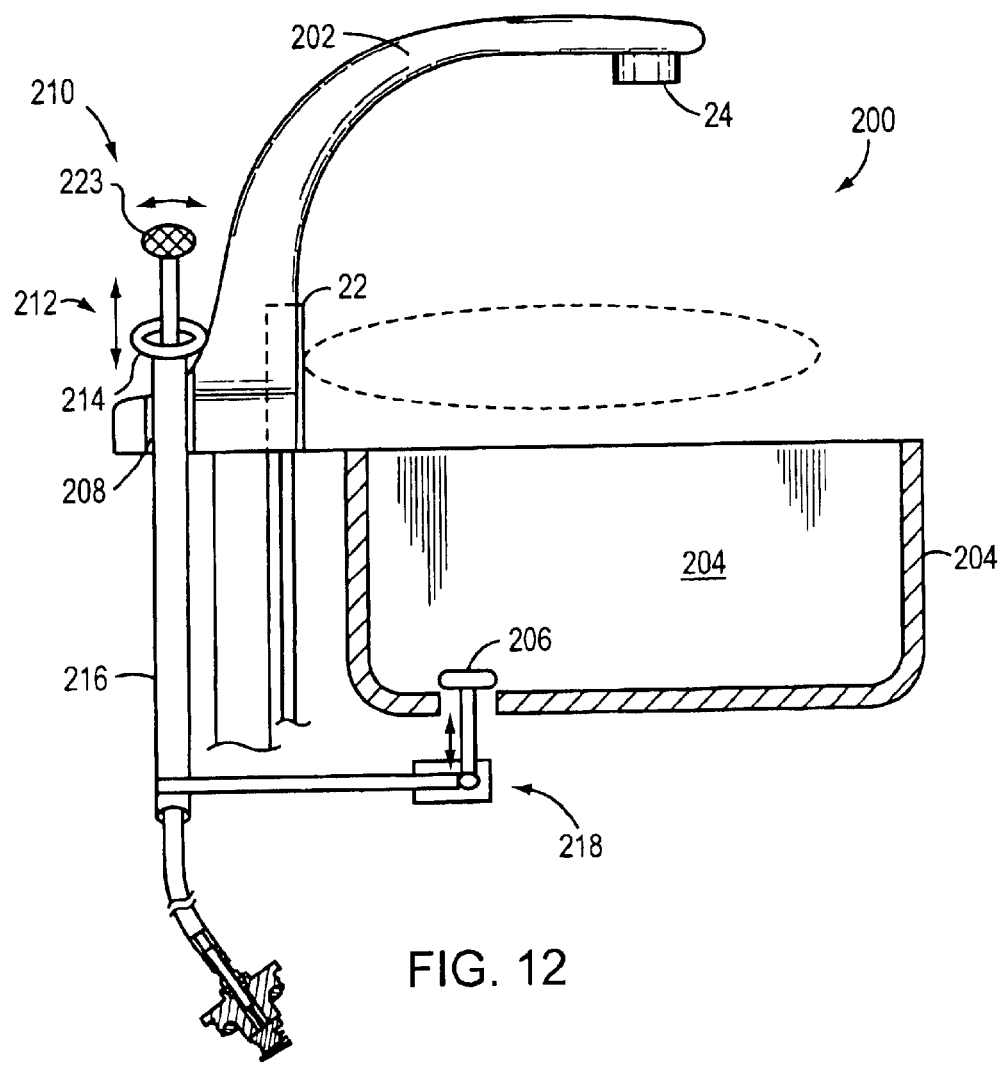
FIG. 12 is a cross-sectional view of a faucet including a mixing valve and a manual override control.
Figure 12A:
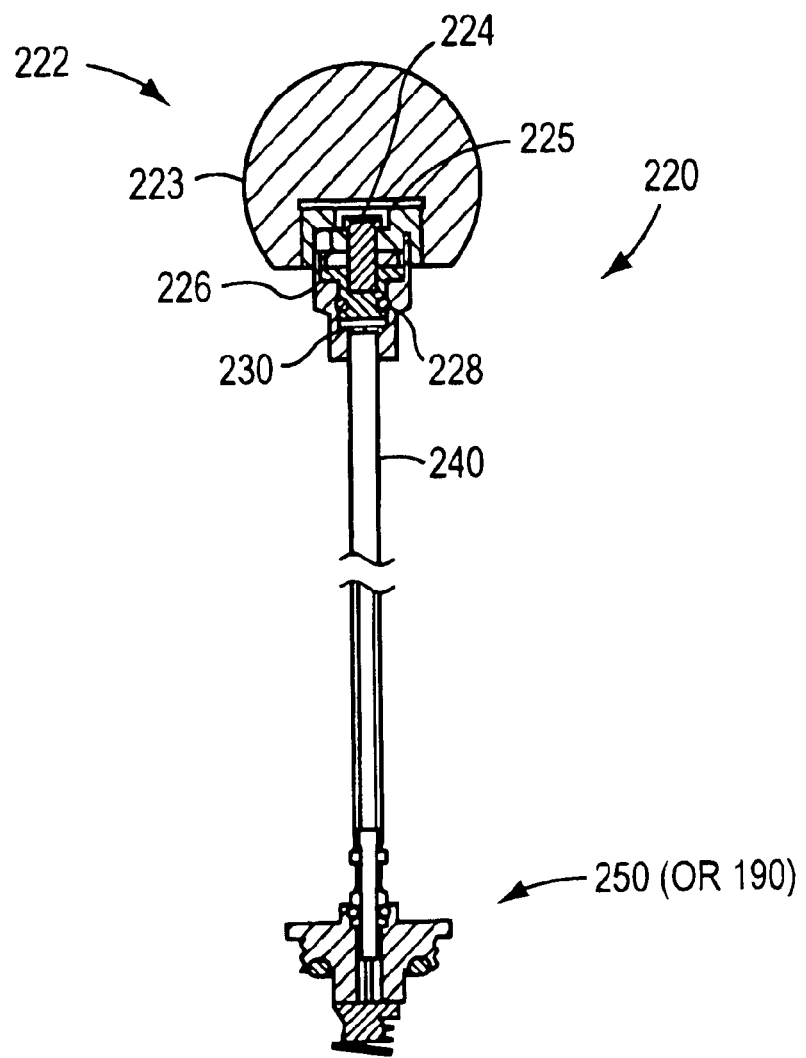
FIG. 12A shows schematically a control arrangement for the manual override used in the valve device shown in FIG. 2 or FIG. 7.

FIGS. 12 and 12A illustrate a novel control for manual actuator 27 or 27'. The manual actuator control controls mechanically, hydraulically or electronically the location of plunger 190 (FIG. 8D) of the manual actuator to override automatic operation of the faucet system shown in FIGS. 1 and 1A.

Referring to FIG. 12, automatic faucet system 200 includes a faucet 202, a sink or washbasin 204, a sensor 22, a valve device (as in FIGS. 1 and 1A) and a control assembly 210. Control assembly 210 includes a sink drain control assembly 212 and a manual actuator control 220 (FIG. 12A). Automatic faucet system 200 includes a sensor-based water control device 10 or 100, which together with a control circuit, is located below the sink level. The system uses a mechanical or electronic assembly that enables the conversion of water flow control from automatic to manual and vice versa (i.e., device 10 or 100 can be controlled by both automatic and manual actuators).

The manual actuator control includes a knob or handle 223 near the spout's above deck location. A user can thus manually control the manual actuator to control the conversion from an automatic control to a manual control without reaching below the sink. The manual actuator control can be used with existing, prior art faucets for bathroom or kitchen applications because it uses an available passage such as the sink drain control passage, the water pipe passage, or the like. This retrofit feature provides an important advantage.

FIG. 12 illustrates a preferred embodiment of a control assembly 210 installed inside sink drain control passage 208. Control assembly 210 includes a drain control assembly 212 having a handle 214 connected to a rigid tube 216 coupled to a sink drain control arm 218. Depending on the arrangement, raising, lowering or rotating handle 214 raises or lowers plug 206. Manual actuator control 220 is co-operatively arranged with drain control assembly 212.

Referring to FIG. 12A, according to one embodiment, manual actuator control 220 includes a knob assembly 222, a flex tube 240, and actuator head 250. Actuator head 250 is constructed and arranged to fit on manual actuator 27 (FIG. 2) or manual actuator 27' (FIG. 7). According to one embodiment, actuator head 250 is identical to actuator insert 190 described in connection with FIG. 8D. Knob assembly 222 includes a knob 223 and an adapter 224 coupled to screws 225 and 226. Knob assembly 222 is arranged to displace fluid located in flex tube 240 by performing a rotational or translational movement. Knob assembly 222 also includes an O-ring 228 for sealing a cavity 230 arranged to transfer the motion of knob 223 to the non-compressible fluid. Fluid in flex tube 240 traverses up or down, which results in piston 250 traversing up or down, thereby opening or controlling the pilot valve of the manual actuator.

According to another embodiment, manual actuator control 220 includes a knob assembly connected to flexible wire or flexible rod instead of flex tube 240. The flexible wire or rod transfers rotational or translational motion to actuator head 250. As described above, the flexible wire or rod traverses rigid external tube 216 of drain control assembly 212. Rigid external tube 216 is attached to conventional drain shut-off mechanism 218. The termination of the flex cable is connected to the override pilot control (in place of the rotating handle shown in FIG. 8D) of the manual actuator. When the cable is extended outward, the bypass is inactive, (i.e. device 100 is in automatic mode) and when the cable end is retracted, device 100 is in a bypass mode, (i.e. the faucet is in a manual mode).

According to another embodiment, the manual actuator uses a remote control of the override automatic control, rather than using assembly 220. According to another modality, wherein the transfer of control signals are attained via electrical signals, the use of tri-state conditions is attainable, for example, having an automatic mode, a metering mode and a manual mode (but other combinations/modalities can be also added). Thus, there are numerous embodiments of the manual override that is an important part of the preferred embodiments.

Having described various embodiments and implementations of the present invention, it should be apparent to those skilled in the relevant art that the foregoing is illustrative only and not limiting, having been presented by way of example only. There are other embodiments or elements suitable for the above-described embodiments, described in the above-listed publications and patents, all of which are incorporated by reference as if fully reproduced herein. The functions of any one element may be carried out in various ways in alternative embodiments. Also, the functions of several elements may, in alternative embodiments, be carried out by fewer, or a single, element.

What is claimed is:

1. An automatic faucet system including a water outlet, an object sensor connected to a control circuit, a hot water pipe, a cold water pipe, and a valve device having two valves actuated by an automatic actuator for controlling flow of hot water and cold water based on signals received from said control circuit; said valve device including a pilot mechanism being in communication with each said valve via a fluid passage and being controlled by said automatic actuator, each said valve including a first check valve and a second check valve both being located in communication with said fluid passage and constructed to prevent mixing of said hot water and said cold water provided at different fluid pressures.

2. The automatic faucet system of claim 1 wherein said two valves include a first diaphragm operated valve and a second diaphragm operated valve.

3. The automatic faucet system of claim 1 wherein each of said two valves includes a piston for opening or closing said valve.

4. The automatic faucet system of claim 2 wherein said device includes:

hot water input and output ports and cold water input and output ports; said pilot mechanism being constructed for simultaneously controlling flow of hot water between said hot water input and output ports and flow of cold water between said cold water input and output ports.

5. The automatic faucet system of claim 4 wherein said pilot mechanism includes a pressure release mechanism constructed to lower simultaneously pressure at each said diaphragm and thereby open each said diaphragm operated valve.

6. The automatic faucet system of claim 5 wherein a main body of said valve device is constructed to have said diaphragm operated valves arranged symmetrically with respect to said pressure release mechanism.

7. The automatic faucet system of claim 5 wherein said pressure release mechanism includes a fluid passage being in communication with a diaphragm chamber of said diaphragm operated valve and being arranged to be simultaneously controlled by a movement of a single sealing member actuated by said single automatic actuator.

8. The automatic faucet system of claim 1 wherein said single automatic actuator includes a manual override.

9. The automatic faucet system of claim 8 wherein said manual override operates without electric power.

10. The automatic faucet system of claim 1 wherein said valve device further includes a manual actuator constructed to control flow of said hot water and said cold water independently of said automatic actuator.

11. The automatic faucet system of claim 1 wherein said single automatic actuator includes an electromagnetic actuator.

12. The automatic faucet system of claim 1 wherein said single automatic actuator includes a bi-stable electromagnetic actuator.

13. The automatic faucet system of claim 4 wherein said check valves are constructed to operate at a differential pressure of about 20 psi between hot and cold water.

14. The automatic faucet system of claim 4 wherein said check valves are constructed to operate at a differential pressure of about 60 psi between hot and cold water.

15. An automatic faucet system including a water outlet in form of a faucet, a water pipe coupled to a valve device being actuated by an automatic actuator designed to control water flow based on a state of said automatic actuator, a manual actuator coupled to said valve device designed to control water flow through said valve device independently of said automatic actuator, and a control for said manual actuator arranged in a control passage, said manual actuator control including a handle located above a base of said faucet near said water outlet and an elongated body located in said control passage and extending significantly below said faucet base.

16. An automatic faucet system including a water outlet in form of a faucet, a water pipe coupled to a valve device being actuated by an automatic actuator designed to control water flow based on a state of said automatic actuator, a manual actuator coupled to said valve device designed to control water flow independently of said automatic actuator, and a control for said manual actuator arranged in a control passage, said manual actuator control including a handle located above a base of said faucet near said water outlet and an elongated body located in said control passage, wherein said control passage includes a sink plug control passage modified to accommodate said manual actuator control.

17. The automatic faucet system of claim 16 wherein said sink plug control passage is also used to control a sink plug.

18. The automatic faucet system of claim 15 wherein said manual actuator control uses mechanical torque actuation to change a state of said manual actuator.

19. The automatic faucet system of claim 18 wherein said mechanical torque actuation includes a flex cable coupled to said handle.

20. An automatic faucet system including a water outlet in form of a faucet, a water pipe coupled to a valve being actuated by an automatic actuator designed to control water flow based on a state of said automatic actuator, a manual actuator coupled to said valve device designed to control water flow independently of said automatic actuator, and a control for said manual actuator arranged in a control passage, said manual actuator control including a handle located above a base of said faucet near said water outlet and an elongated body located in said control passage, wherein said manual actuator control uses hydraulic torque actuation to change a state of said manual actuator.

21. The automatic faucet system of claim 20 wherein said hydraulic torque actuation includes a flexible tube filled with fluid.

22. An automatic faucet system including a water outlet in form of a faucet, a water pipe coupled to a valve being actuated by an automatic actuator designed to control water flow based on a state of said automatic actuator, a manual actuator coupled to said valve device designed to control water flow independently of said automatic actuator, and a control for said manual actuator arranged in a control passage, said manual actuator control including a handle located above a base of said faucet near said water outlet and an elongated body located in said control passage, wherein said manual actuator control uses pneumatic torque actuation to change a state of said manual actuator.

23. The automatic faucet system of claim 22 wherein said pneumatic torque actuation includes a flexible tube filled with gas.

24. The automatic faucet system of claim 15 wherein said manual actuator control uses an electrical cable located in said passage for communication with said manual actuator.

25. The automatic faucet system of claim 15 further including an object sensor connected to a control circuit and arranged to provide a signal to said automatic actuator.

26. The automatic faucet system of claim 16 wherein said sink plug control passage includes an elongated rigid element arranged for controlling a sink plug and an elongated flexible element being part of said manual actuator control.

27. The automatic faucet system of claim 26 wherein said elongated rigid element includes a tube arranged to receive said elongated flexible element.

28. An automatic faucet system including a water outlet in form of a faucet, an object sensor connected to a control circuit, a hot water pipe, a cold water pipe, and a valve device having two valves actuated by an automatic actuator for controlling flow of hot water and cold water, a manual actuator coupled to said valve device designed to control water flow through said valve device independently of said automatic actuator, and a control for said manual actuator arranged in a control passage, said manual actuator control including a handle located above a base of said faucet near said water outlet and an elongated body located in said control passage and extending significantly below said faucet base.

29. An automatic faucet system including a water outlet in form of a faucet, an object sensor connected to a control circuit, a hot water pipe, a cold water pipe, and a valve device having two valves actuated by an automatic actuator for controlling flow of hot water and cold water, a manual actuator coupled to said valve device designed to control water flow independently of said automatic actuator, and a control for said manual actuator arranged in a control passage, said manual actuator control including a handle located above a base of said faucet near said water outlet and an elongated body located in said control passage wherein said control passage includes a sink plug control passage modified to accommodate said manual actuator control.

30. The automatic faucet system of claim 29 wherein said sink plug control passage is also used to control a sink plug.

31. An automatic faucet system including a water outlet in form of a faucet, an object sensor connected to a control circuit, a hot water pipe, a cold water pipe, and a valve device having two valves actuated by an automatic actuator for controlling flow of hot water and cold water, a manual actuator coupled to said valve device designed to control water flow independently of said automatic actuator, and a control for said manual actuator arranged in a control passage, said manual actuator control including a handle located above a base of said faucet near said water outlet and an elongated body located in said control passage, wherein said manual actuator control uses mechanical torque actuation to change a state of said manual actuator.

32. The automatic faucet system of claim 31 wherein said mechanical torque actuation includes a flex cable coupled to said handle.

33. An automatic faucet system including a water outlet in form of a faucet, an object sensor connected to a control circuit, a hot water pipe, a cold water pipe, and a valve device having two valves actuated by an automatic actuator for controlling flow of hot water and cold water, a manual actuator coupled to said valve device designed to control water flow independently of said automatic actuator, and a control for said manual actuator arranged in a control passage, said manual actuator control including a handle located above a base of said faucet near said water outlet and an elongated body located in said control passage, wherein said manual actuator control uses hydraulic torque actuation to change a state of said manual actuator.

34. The automatic faucet system of claim 33 wherein said hydraulic torque actuation includes a flexible tube filled with fluid.

35. A method for controlling water flow in an automatic faucet system including a water outlet above a sink, comprising the acts of:

providing a main body arranged to receive a first valve and a second valve, said main body including a pilot mechanism and a check valve;

providing a manual actuator connected to a manual actuator control arranged in a control passage, said manual actuator control including a handle located near said water outlet and an elongated body located in a control passage; and triggering said pilot mechanism at said main body using said manual actuator control and thereby changing a state of both said valves.

\* \* \* \* \*